US009449201B2

(12) United States Patent
Moran et al.

(10) Patent No.: US 9,449,201 B2
(45) Date of Patent: *Sep. 20, 2016

(54) INTEGRATED UNIT FOR READING IDENTIFICATION INFORMATION BASE ON INHERENT DISORDER

(71) Applicants: Peter Malcolm Moran, Singapore (SG); Narayan Nambudiri, Singapore (SG); Ma Bo, Singapore (SG); Chi Wei Lee, Singapore (SG)

(72) Inventors: Peter Malcolm Moran, Singapore (SG); Narayan Nambudiri, Singapore (SG); Ma Bo, Singapore (SG); Chi Wei Lee, Singapore (SG)

(73) Assignee: BILCARE TECHNOLOGIES SINGAPORE PTE. LTD., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 14/691,228

(22) Filed: Apr. 20, 2015

(65) Prior Publication Data
US 2015/0324618 A1 Nov. 12, 2015

Related U.S. Application Data

(63) Continuation of application No. 13/877,568, filed as application No. PCT/SG2011/000306 on Sep. 8, 2011, now Pat. No. 9,010,638.

(60) Provisional application No. 61/380,746, filed on Sep. 8, 2010, provisional application No. 61/380,735, filed on Sep. 8, 2010.

(51) Int. Cl.
*G06K 7/00* (2006.01)
*G06K 19/18* (2006.01)
(Continued)

(52) U.S. Cl.
CPC ......... *G06K 7/0004* (2013.01); *G06K 7/10821* (2013.01); *G06K 19/06037* (2013.01); *G06K 19/0723* (2013.01); *G06K 19/086* (2013.01); *G06K 19/14* (2013.01); *G06K 19/18* (2013.01)

(58) Field of Classification Search
CPC ...... G06K 9/26; G06K 9/325; G06K 7/0008; G06K 7/10198; G06K 7/10821; G06K 19/086; G06K 19/08; G06K 19/14; G06K 19/0723; G06K 19/12; G02B 27/48; H01S 5/4025; H01S 5/02248; G07D 7/04; G07D 7/2033
USPC ......... 235/440, 462.31, 375, 462.17, 462.22; 340/10.1, 10.4
See application file for complete search history.

(56) References Cited

U.S. PATENT DOCUMENTS

| 5,920,538 A | 7/1999 | Il'Yashenko |
| 7,264,169 B2 | 9/2007 | Juds |

(Continued)

FOREIGN PATENT DOCUMENTS

| EP | 0696779 | 2/1996 |
| WO | WO 2005/008294 | 1/2005 |

(Continued)

OTHER PUBLICATIONS

European Supplementary Search Report_EP11823862.5_Apr. 8, 2014_Bilcare Technologies Singapore Pte. Ltd.

(Continued)

*Primary Examiner* — Edwyn Labaze
(74) *Attorney, Agent, or Firm* — Pillsbury Winthrop Shaw Pittman LLP

(57) ABSTRACT

The invention provides an authentication unit for reading identification and/or authentication information from a tag or object. The authentication unit includes a near-field reader configured to read a first identification feature based on inherent disorder, and a far-field reader configured to read a second identification feature, such as a bar code, optical characters, or an RFID tag. The near-field and far-field readers may be combined in a single integrated scanning module, which also includes circuitry for receiving signals from the readers, and an interface for communicating with a host device.

11 Claims, 21 Drawing Sheets

(51) Int. Cl.
*G06K 19/06* (2006.01)
*G06K 19/07* (2006.01)
*G06K 19/14* (2006.01)
*G06K 7/10* (2006.01)
*G06K 19/08* (2006.01)

(56) References Cited

U.S. PATENT DOCUMENTS

| | | | |
|---|---|---|---|
| 7,380,128 | B2 | 5/2008 | Bourrieres et al. |
| 7,527,207 | B2 | 5/2009 | Acosta et al. |
| 7,677,438 | B2 | 3/2010 | DeJean et al. |
| 9,122,969 | B2 | 9/2015 | Fein |
| 2005/0017082 | A1* | 1/2005 | Moran ............ G06K 19/06196 235/493 |
| 2006/0022059 | A1 | 2/2006 | Juds |
| 2007/0005367 | A1 | 1/2007 | DeJean et al. |
| 2008/0210757 | A1* | 9/2008 | Burden ................ G07D 7/02 235/449 |
| 2008/0238621 | A1 | 10/2008 | Rofougaran et al. |
| 2009/0167502 | A1 | 7/2009 | Erickson et al. |
| 2009/0309733 | A1 | 12/2009 | Moran et al. |
| 2012/0019363 | A1 | 1/2012 | Fein |
| 2012/0116887 | A1 | 5/2012 | Norair |
| 2012/0168506 | A1* | 7/2012 | Ruehrmair ............ G06F 21/73 235/454 |
| 2013/0087620 | A1* | 4/2013 | Sharma .................. G06K 19/14 235/472.01 |
| 2013/0267173 | A1 | 10/2013 | Ling et al. |

FOREIGN PATENT DOCUMENTS

| | | |
|---|---|---|
| WO | WO 2005/104008 | 11/2005 |
| WO | WO 2006/016114 | 2/2006 |
| WO | WO 2006/078220 | 7/2006 |
| WO | WO 2007/133163 | 11/2007 |
| WO | WO 2007/133164 | 11/2007 |
| WO | WO 2009/105040 | 8/2009 |

OTHER PUBLICATIONS

Wikipedia: "Near and far field optics" XP002722182 Retrieved from the Internet URL: http://en.wikipedia.org/wiki/Near-field_optics [retrieved on Mar. 21, 2014].
Wikipedia: "Near and far field optics" XP002722182 Retrieved from the Internet URL: http://en.wikipedia.org/wiki/Near_and_far_field [retrieved on Mar. 21, 2014].

* cited by examiner

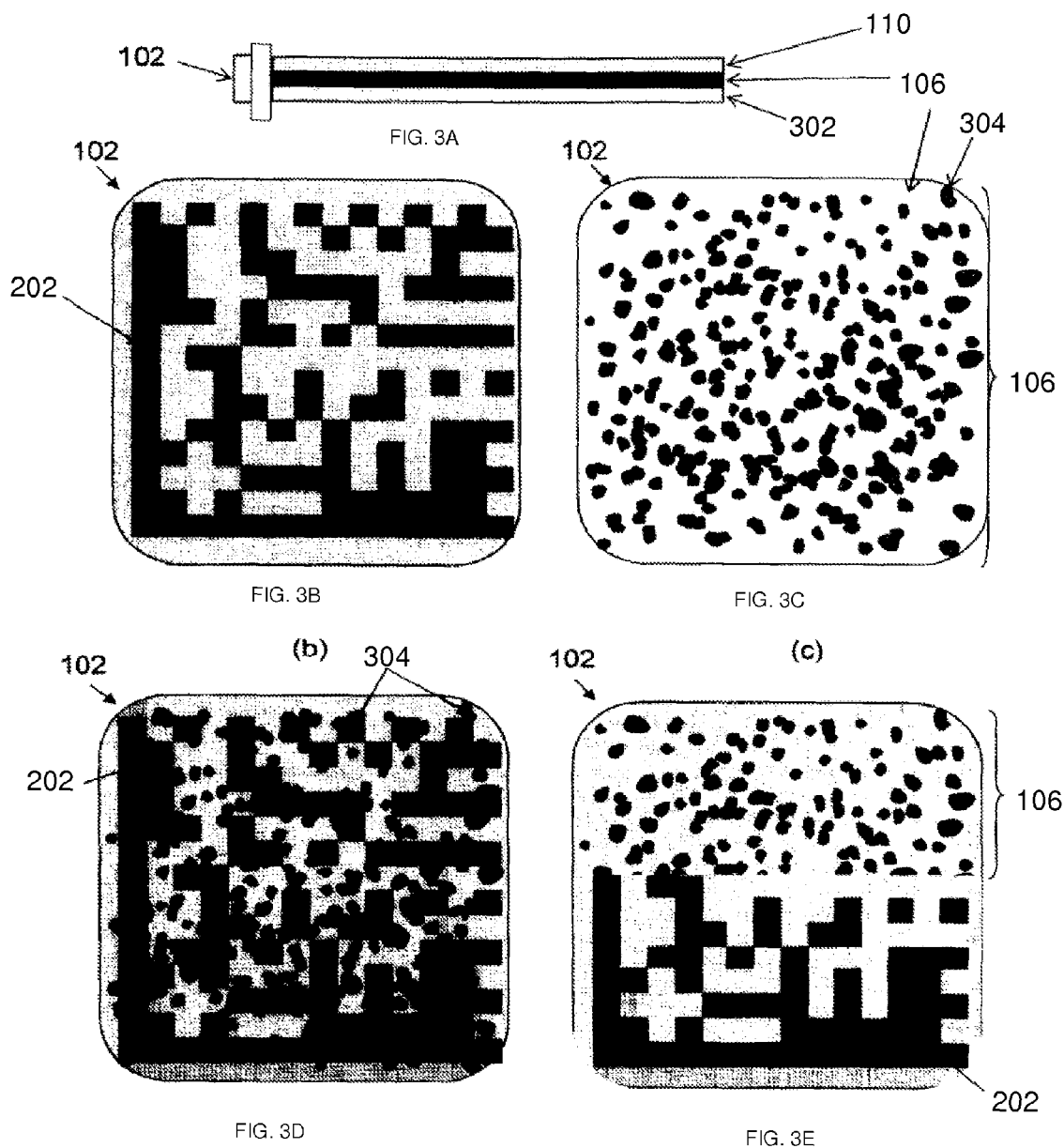

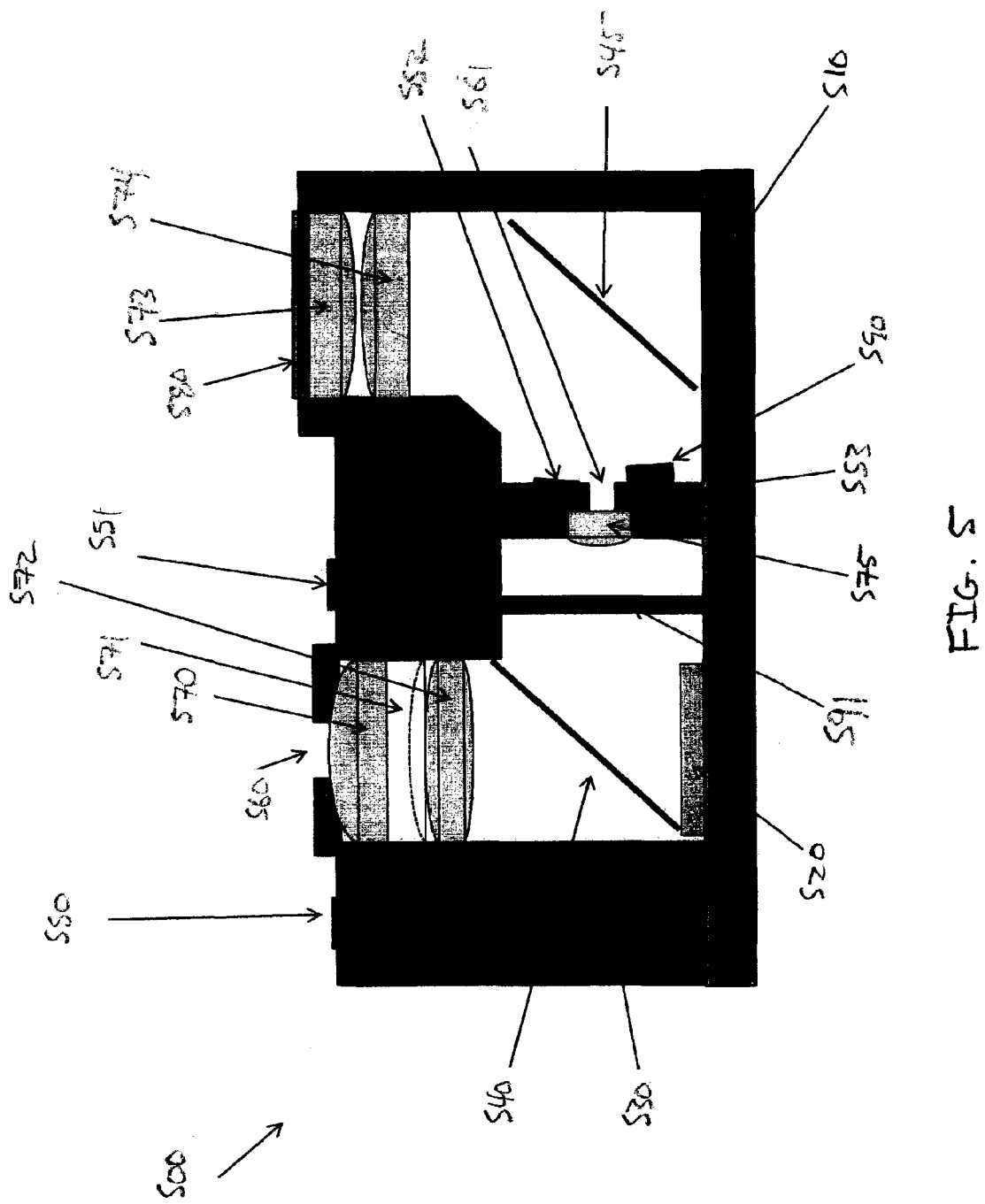

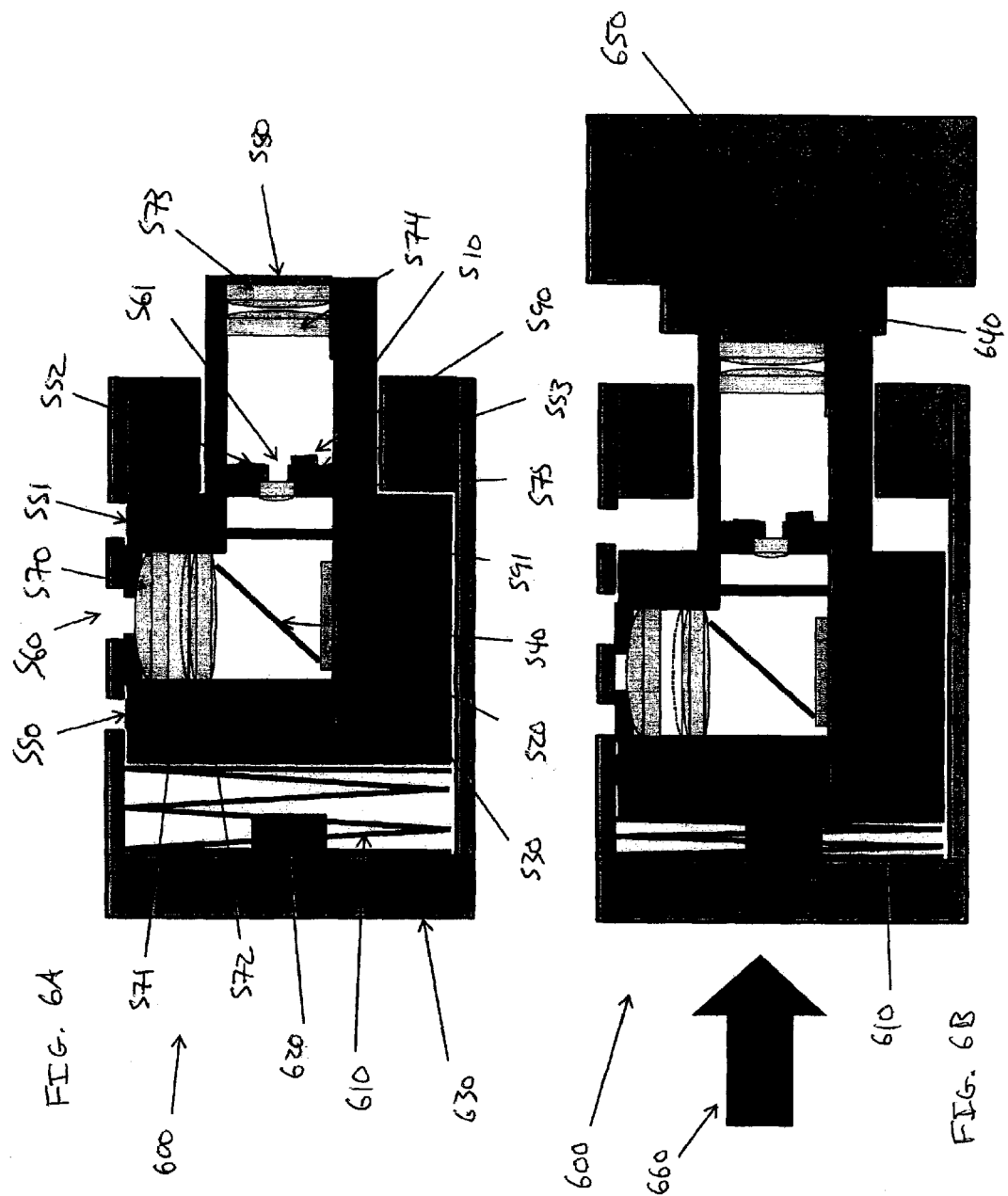

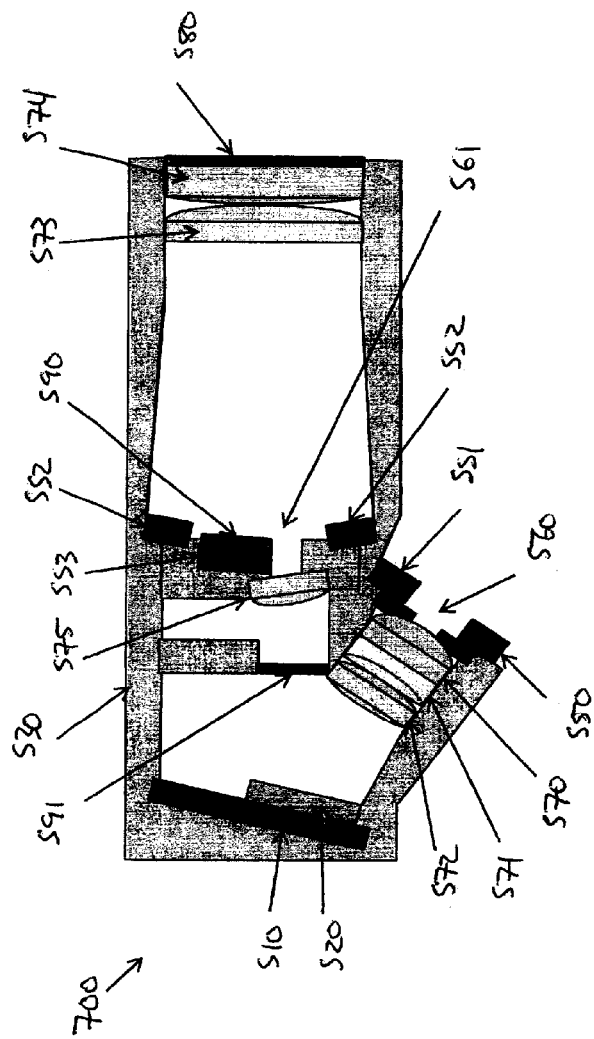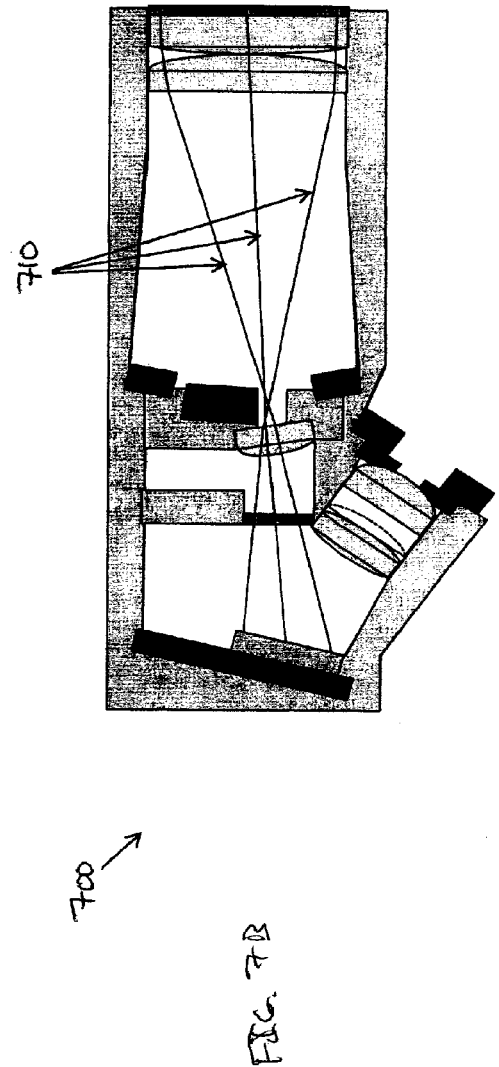
FIG. 7A
FIG. 7B

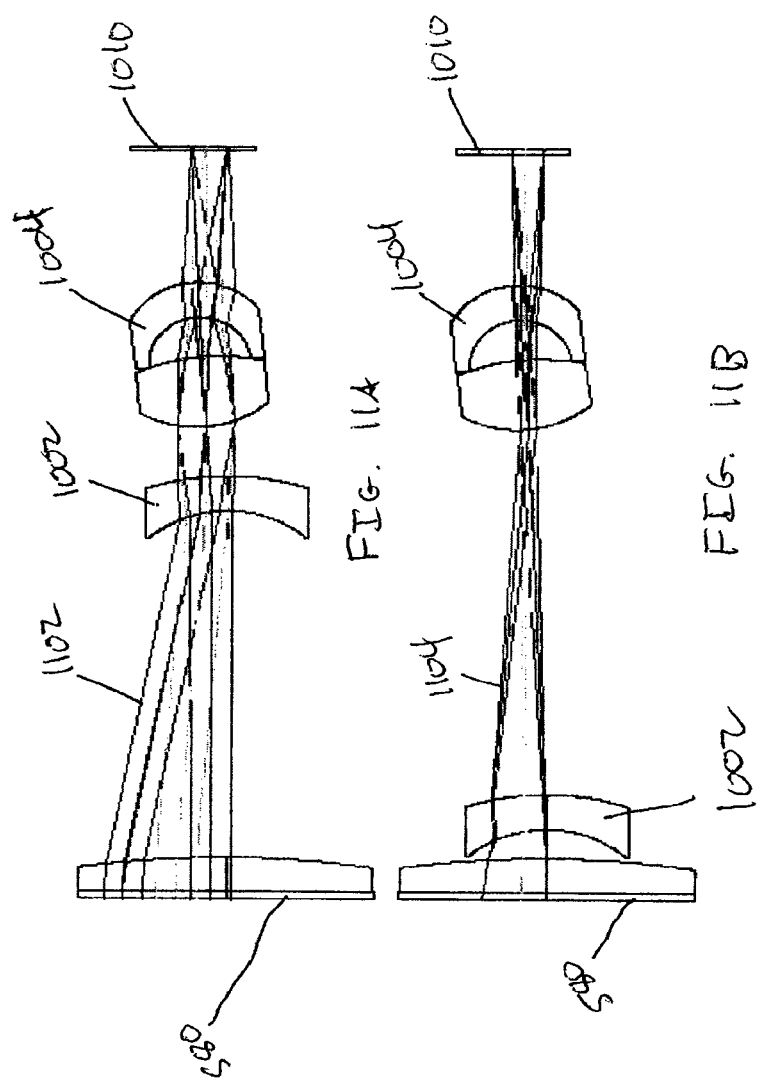

INTEGRATED UNIT FOR READING IDENTIFICATION INFORMATION BASE ON INHERENT DISORDER

CROSS-REFERENCES TO RELATED APPLICATIONS

This application is a continuation of U.S. application Ser. No. 13/877,568 filed on Aug. 19, 2013, which is a U.S. National Stage application under 35 USC §371 of PCT/SG2011/000306 filed Sep. 8, 2011, which claims benefit to U.S. provisional Ser. No. 61/380,746 filed Sep. 8, 2010 and U.S. Provisional Ser. No. 61/380,735, the entire contents of each of these applications being incorporated herein by reference

FIELD OF THE INVENTION

Embodiments of the invention relate to the field of devices for reading authentication and identification features based on inherent disorder. In particular, the invention relates to an integrated unit that is able to read a first set of identification features based on inherent disorder, and a second set of identification and/or authentication features.

BACKGROUND OF THE INVENTION

Identification features such as bar codes, optical characters, Radio Frequency Identification (RFID), magnetic or optical strips, and other means of identifying or authenticating objects have been used for purposes of identification, authentication, and tracking and tracing. Recently, "inherent disorder"-based features of objects have also been used either alone or in combination with other identification features to uniquely identify objects and to provide evidence of the authenticity of objects for anti-counterfeiting purposes. An "inherent disorder"-based feature is a feature based on a disordered material, wherein the structure of the disorder is used to identify the object. The disordered material may be a part of the object itself, or may be part of a tag that is affixed to the object. Further, the disordered material may include a disordered coating, composite, or structure.

There are numerous previously known examples of the use of inherent disorder for identification and authentication purposes. For example, Ingenia Technology Limited, of London, UK, has described a system that uses the inherent disorder of fibers within paper, mapped using laser-speckle interferometry, to uniquely identify the paper. A more complete description of this technology can be found in PCT application WO 2006/016114.

Another previously known use of inherent disorder is shown in U.S. Pat. No. 7,380,128, assigned to Novatec, SA, of Montauben, France. This patent shows use of random bubbles within a transparent polymer for identification and authentication. Optical methods are used to read the three-dimensional layout of the bubbles within the polymer. This information can be used to provide a unique signature for a "bubble tag", which is difficult or impossible to replicate.

Other inherent disorder-based identification and authentication technologies include use of randomly distributed quantum dots or nanobarcodes, use of ink containing magnetic particles arranged in a disordered pattern, use of random "jitter" in the magnetic stripes of credit cards, and use of random distribution of taggant particles that are invisible to human vision on an article (see PCT application WO 2005/104008).

Additional inherent disorder-based tags that use a combination of magnetic and/or magnetisable and/or conductive and/or semi-conductive and/or optically active particles and/or optically distinguishable particles have been reported by the present applicant, Bilcare Technologies. These technologies are further detailed in commonly-owned PCT applications WO 2005/008294, WO 2006/078220, WO 2007/133164, WO 2007/133163, and WO 2009/105040.

Various signal detection systems based on optical, magnetic, and magneto-optical effects are used to read these inherent disorder features. Once read, information on the inherent disorder features can be processed either in the reading device itself or in a back-end computer system to use the information for identification and/or authentication purposes.

In most cases, these inherent disorder features are read from a very short range—often with the reader or detector in physical contact with the surface from which the feature is being read. This is (in part) due to the small scale of many inherent disorder features, and the high accuracy with which they typically must be read.

In the field of anti-counterfeiting and authentication technology, it is advantageous to use combinations of technologies for enhanced protection. Accordingly, it may be advantageous to combine inherent disorder features with other identification or authentication features, such as barcodes, magnetic strips, optical characters, RFID, or other identification technologies.

SUMMARY OF THE INVENTION

In one embodiment, the invention provides an authentication unit that includes a near-field reader configured to read one or more first identification features based on inherent disorder; and a far-field reader configured to read one or more second identification features. In some embodiments, the authentication unit further includes a housing, and the near-field reader and the far-field reader are both contained within the housing.

In some embodiments, the near-field reader includes an optical element, the far-field reader includes an optical element, and at least one optical element is shared between the near-field reader and the far-field reader. In some of these embodiments, the at least one shared optical element includes a beamsplitter. In some embodiments, the at least one shared optical element includes a switchable mirror. In some embodiments, the at least one shared optical element includes a lens. In some embodiments, the lens is configured to be movable between a position used for near-field reading and a position used for far-field reading.

In some embodiments, the authentication unit further includes an image sensor that is shared by both the near-field reader and the far-field reader. In some of these embodiments, the image sensor may be a CMOS image sensor or a CCD image sensor. In some embodiments, the image sensor is configured to be mechanically moved relative to a near-field portion of the authentication and a far-field portion of the authentication unit. In some such embodiments the image sensor is configured to be slidably moved between a position in an optical path of the near-field portion of the authentication unit and a position in an optical path of the far-field portion of the authentication unit. In some embodiments wherein the image sensor is configured to have relative motion along an angular path between a position in an optical path of the near-field portion of the authentication unit and a position in an optical path of the far-field portion of the authentication unit.

In some embodiments, the authentication unit includes a first image sensor and a second image sensor, wherein the first image sensor is configured to be used by the near-field reader to read the first identification feature, and the second image sensor is configured to be used by the far-field reader to read the second identification feature. Each of these image sensors may be a CMOS image sensor or a CCD image sensor.

In some embodiments, the near-field reader includes a first lens, and the far-field reader includes a second lens. The first lens and the second lens may be arranged in a fixed spatial relationship to each other.

In some embodiments, the authentication unit further includes a proximity sensing device. Here this will be termed a "proximity sensor" even though this may be a tactile or other switch which is depressed upon the reader being pushed against a surface. The near-field reader is activated when the proximity sensor is in a first state, and the far-field reader is activated when the proximity sensor is in a second state. In some of these embodiments, the proximity sensor may be a push button (e.g. a tactile or other switch). The near-field reader may be activated when the push button is in a pressed state, and the far-field reader may be activated when the push button is in an unpressed state.

In some embodiments, the authentication unit includes a first lighting element and a second lighting element, wherein the first lighting element is configured to be activated when the near-field reader is use, and the second lighting element is configured to be activated when the far-field reader is in use.

In some embodiments, the near-field reader is configured to direct light used for reading the first identification feature along a first optical axis, and the far-field reader is configured to direct light used for reading the second identification feature along a second optical axis. At least a portion of the second optical axis does not coincide with the first optical axis.

In some embodiments, the first identification feature based on inherent disorder includes a disordered arrangement of magnetic or magnetisable particles included in a magnetic fingerprint region of a tag or object. In some of these embodiments, the near-field reader includes a magneto-optical substrate that permits the disordered arrangement of magnetic or magnetisable particles in the magnetic fingerprint region to be detected optically. The near-field reader may be further adapted to read an optical feature that overlaps with the magnetic fingerprint region on the tag or object. In some embodiments, this optical feature may include a barcode. In some embodiments, the authentication unit may include a magneto-optical substrate configured to permit light to pass through the magneto-optical substrate to read the optical feature as well as the first identification feature. The near-field reader may include a first lighting element configured to emit light having a first wavelength for reading the first identification feature, and a second lighting element configured to emit light having a second wavelength for reading an optical feature. The magneto-optical substrate may include a wavelength selective mirror layer, such as a dichroic mirror or dielectric mirror, configured to reflect light of the first wavelength, and to permit light of the second wavelength to pass through the wavelength selective mirror. Hereinafter the terms "dichroic" and "dielectric" mirror are used interchangeably to mean a mirror that is able to selectively reflect a portion of the visible spectrum. Alternately, or in addition, the magneto-optical substrate may include a mirror layer which does not cover the entire field of view such that there is a hole for light to pass the mirror and be detected by the image sensor.

In some embodiments, the near-field reader, which is configured to read at least a first identification feature based on inherent disorder, is selected from a reader that reads features of the inherent disorder of fibers within paper, a bubble tag reader, a reader for randomly distributed quantum dots or nanobarcodes, a reader for a non-magnetic or weakly magnetic matrix material containing magnetic particles arranged in a disordered pattern, a reader for random jitter in the magnetic stripes of credit cards, a reader for randomly distributed taggant particles that may be invisible to unassisted human vision, and a reader for magnetic and/or magnetisable and/or conductive and/or semi-conductive and/or optically active particles and/or optically distinguishable particles. In some embodiments, the far-field reader is selected from a barcode reader, an optical character reader, and an RFID reader.

Some embodiments of the invention provide a scanning module that includes an authentication unit of one of the previously mentioned embodiments, combined with circuitry configured to receive signals from the authentication unit, and an interface configured to communicate with a host device.

In some embodiments, the authentication unit, the circuitry, and the interface are all mounted on a single PCB. In other embodiments, the authentication unit is connected via a cable to a PCB on which the circuitry and interface are disposed.

In some embodiments, the circuitry includes a microcontroller and a memory. The memory may contain instructions that, when executed by the microcontroller, cause the scanning module to operate in a selected operation mode.

Further embodiments of the invention provide an authentication unit that includes a first near-field reader configured to read a first identification feature based on inherent disorder; and a second near-field reader configured to read a second identification feature, wherein the first identification feature and the second identification feature are arranged in a predetermined, non-overlapping spatial relationship to each other.

In some embodiments, the first near-field reader, which is configured to read a first identification feature based on inherent disorder, is one of a reader that reads features of the inherent disorder of fibers within paper, a bubble tag reader, a reader for randomly distributed quantum dots or nanobarcodes, a reader for a non-magnetic or weakly magnetic matrix material, such as ink, containing magnetic particles arranged in a disordered pattern, a reader for random jitter in the magnetic stripes of credit cards, a reader for randomly distributed taggant particles that may be invisible to unassisted human vision, and a reader for magnetic and/or magnetisable and/or conductive and/or semi-conductive and/or optically active particles and/or optically distinguishable particles. In some embodiments, the second near-field reader may be any of these inherent disorder readers, a magnetic strip reader, a near-field barcode reader or a near-field RFID reader.

In some embodiments, the authentication unit is adapted to read a first signal from a first set of identification features and a second signal from a second set of identification features, wherein the sets of identification features are housed on, in, or near the tag or object to be identified, and wherein the first set of identification features includes a disordered material, and the first signal read from the first set of identification features is dependent on the intrinsic disorder of the material. In some such embodiments, the second set of identification features may be a barcode, optical characters, a radio-frequency identification (RFID) tag, a smart chip, and/or magnetic information written on a magnetic medium. In some such embodiments, the authentication unit includes a reading element adapted to read at least the first signal from the first set of identification features and the second signal from the second set of identification features, while in other embodiments, the authentication unit includes a first reading element adapted to read at least the first signal from the first set of identification features and a second reading element adapted to read the second signal from the second set of identification features.

In some embodiments, the authentication unit further includes a processing element configured to at least partially process the first signal and the second signal. The processor may be configured to link the first signal and the second signal, or to read only the second signal, depending on a sequence and/or a timing of reading the first signal and/or the second signal. The processor may be configured to process the first signal and/or the second signal either together or separately, depending on a determination of which of the first signal and/or the second signal are present in a reading. In some embodiments, the authentication unit further comprises a communication element adapted to communicably link with other components of the device in which the authentication unit is housed or to communicate directly with a remote/external device or system.

Some embodiments of the invention provide a system for reading and identifying a tag or object adapted to be identified, the system comprising a device that includes an authentication unit as discussed above, and one or more of a keyboard, a CPU, a screen, circuitry for external communications, a battery, one or more buttons, memory, and firmware. The data used for identifying the tag or object may be stored in a memory of the device or the authentication unit. Alternatively, the system may include a backend server that stores data used for identifying the tag or object, and wherein the device communicates with the backend server to identify the tag or object.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 3A-3E show various views of an example tag on which magnetic and optical information overlap, and that can be read in accordance with an embodiment of the invention;

FIG. 5 shows a cross-sectional view of an authentication unit having both a near-field inherent disorder reader and a far-field identification and/or authentication feature reader in accordance with an embodiment of the invention;

FIGS. 6A and 6B show cross-sectional views of another example of an authentication unit in accordance with an embodiment of the invention;

FIGS. 7A and 7B show cross-sectional views of a further example of an authentication unit in accordance with an embodiment of the invention;

FIGS. 11A and 11B show optical paths for the example embodiment of FIGS. 10A and 10B;

DESCRIPTION

Figure 1A:
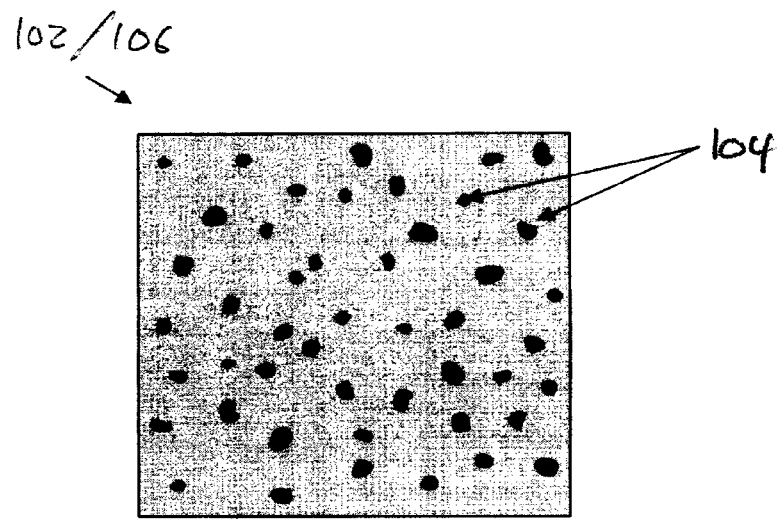
FIGS. 1A and 1B show top and perspective views, respectively, of magnetic particles used in a tag to be read as an inherent disorder feature in accordance with an embodiment of the invention.

As discussed above, it may be useful in identification, authentication, and anti-counterfeiting systems to use more than one type of identification technology for enhanced protection. Accordingly, the invention provides a single, integrated unit that includes both an inherent disorder-type reader, and a reader for at least one other identification and/or authentication feature. By placing both of these readers into the same integrated unit, efficiencies, such as sharing portions of the optics, can be achieved. A single, integrated unit containing such readers and the electronics to decode the signals provided by the readers (referred to herein as a "scanning module") can be integrated into larger host devices for a variety of applications by the manufacturers of such devices, without requiring the manufacturers of such application-specific host devices to fully understand, design, or manufacture the readers for the inherent disorder feature or the at least one other identification and/or authentication feature.

Because reading of inherent disorder features is often done at close range (typically 10 cm or less, but more typically less than 3 cm), due to the scale of the features and the desired accuracy of the readings, the first reader in a scanning module according to an embodiment of the invention may be usable at close range, or (in some embodiments) with the reader in contact with the feature that is being read. Such a reader will be referred to as a "near-field" reader, since it reads features at a close range, i.e. where at least one portion of the reader is within 10 cm of the features at some stage during the reading of said features.

Because other identification features, such as barcodes or RFID are typically readable at a slightly longer range (e.g., typically between 6 and 60 cm for bar code readers, and often a meter or more for RFID-depending on the type of RFID tag), the second reader in the scanning module according to an embodiment of the invention may be a longer range reader. Such a reader will be referred to as a "far-field" reader, since it reads features at a farther range.

Alternatively, in some embodiments, the inherent disorder reader and the second reader may both be near-field readers that read features having a predetermined non-overlapping spatial relationship.

Using an embodiment having both a near-field and a far-field reader permits a reading device in accordance with an embodiment of the invention to be used as, e.g., a "normal" barcode reader, that can also read a special inherent disorder-based authentication or anti-counterfeiting feature when there is an indication that such extra secure authentication might be useful. For example, if a user who is scanning barcode or RFID tags notices that a tag attached to an object may have been tampered with, it is possible, in accordance with an embodiment of the invention, to use the reader containing the same integrated scanning module to perform a second check, using an inherent disorder-based feature, which is more difficult or practically impossible to tamper with or counterfeit.

A first example embodiment of the invention reads an inherent disorder feature based on random positions of magnetic particles in a fixed area, such that the area possesses a unique pattern of such magnetic particles at a fine resolution. As shown below, a tag for use with this embodiment includes a disordered array of magnetic or magnetisable particles forming a magnetic fingerprint region.

Figure 1B:
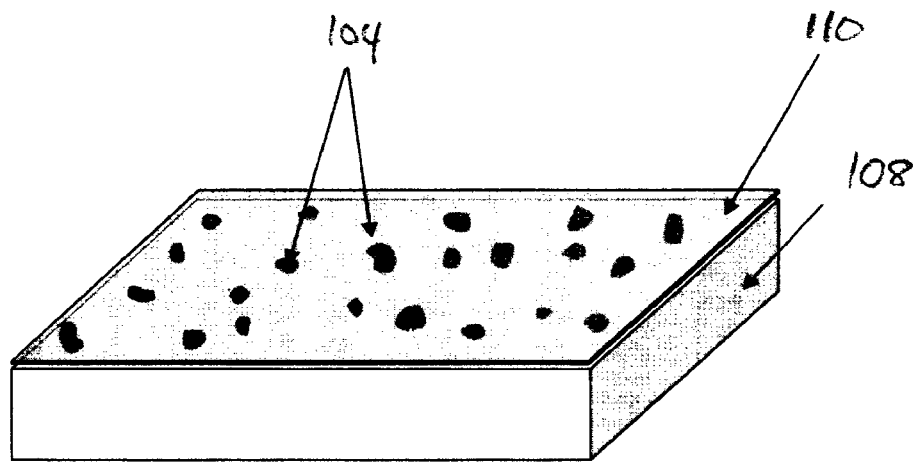

FIG. 1A and FIG. 1B respectively show a top view and a perspective view of magnetic particles 104 (preferably of high magnetic coercivity) used in a tag 102 to be read as an inherent disorder feature in accordance with an embodiment of the invention. To obtain a clear magneto-optical signal, particles 104 of high coercivity magnetic materials which have a high magnetic flux forming the magnetic fingerprint region 106 should be used. FIG. 1B shows that in this embodiment, the magnetic particles 104 form a layer sandwiched between a base layer 108 and a cover layer 110. The base layer 108 and cover layer 110 are generally formed from films of material, with the base layer 108 providing a support for the magnetic particles 104 and the cover layer 110 providing protection from the environment and from abrasion. The maximum thickness that can be used for the cover layer 110 is dependent on the strength of the magnetic fields produced by the magnetic particles 104 (the strength of the magnetic field is itself a function, for example of the remnance magnetization of the magnetic particles 104, their size, the orientation of the magnetic particles 104 and the direction of magnetism), the size and distance between the particles, the sensitivity of the reading element being used to read the magnetic fields, and the expected resolution of the overall system.

The magnetic particles 104 may be distributed within a non-magnetic (or weakly magnetic) matrix material, such as a polymeric material, a metallic material, a glass material, or a ceramic material. The non-magnetic or weakly magnetic material provides one or more of: protection for the particles (particularly protection against moisture if the particles are prone to corrosion), cohesion between the particles and the other layers present (i.e. the non-magnetic material locks the magnetic particles in place—a form of adhesive, for example), and ease of application of the particles to the base or cover layer. In such cases the "magnetic particles 104" is understood to include the non-magnetic or weakly magnetic matrix material where applicable. In certain cases there may be no specific base layer 108 and the magnetic particles 104 may be directly in contact with an adhesive layer at the base of the tag, or they may be exposed.

The magnetic particles 104 may include a high coercivity material. An example of such a high coercivity material is a neodymium magnet comprising Nd, Fe and B. The magnetic particles 104 may include a ferrimagnetic material, an antiferromagnetic material, a ferromagnetic material, or domains of varying magnetic properties within a continuous material (including voids causing variable magnetic properties) and combinations thereof. The ferromagnetic material may be selected from the group consisting of MnBi, CrTe, EuO, $CrO_2$, MnAs, Fe, Ni, Co, Gd, Dy, corresponding alloys and oxides of Fe, Ni, Co, Sm, Gd, Dy, and combinations thereof.

Figure 2B:
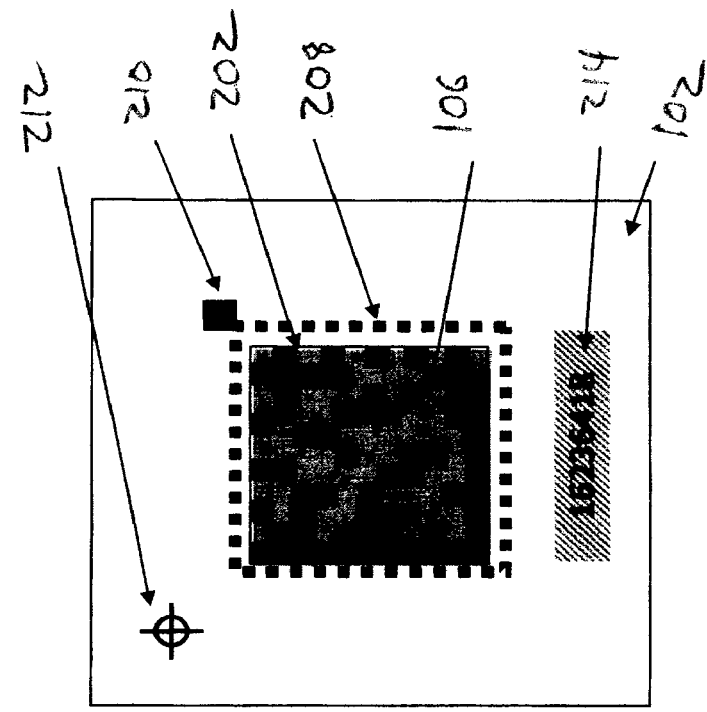
FIGS. 2A and 2B show further example tags with identification features that can be read in accordance with an embodiment of the invention.
Figure 2A:
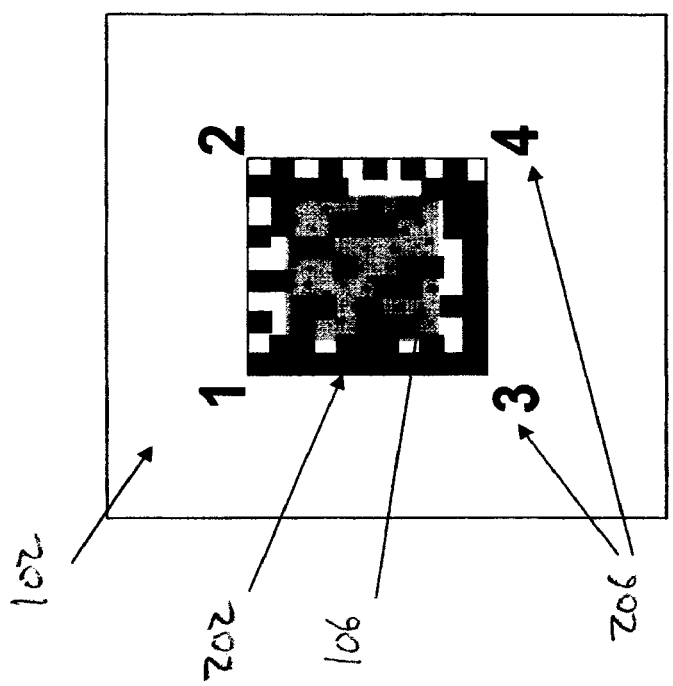

FIGS. 2A and 2B show further examples of tags 102 with identification features that can be read in accordance with an embodiment of the invention. Since additional identification features provide additional security or information, multiple identification features may be adopted. Some of these additional identification features that might be read in accordance with embodiments of the invention include, but are not limited to, magnetic barcodes, magnetic borders, magnetic alphanumeric characters, magnetic fiducial marks, optical barcodes (linear and 2-dimensional, including various industry standards such as DataMatrix), optical fiducial marks, optical alphanumeric characters, and other visible markings. As further examples, the tag 102 may include a Radio Frequency Identification (RFID) chip, security inks or a hologram. A barcode 202 is shown in FIG. 2A as overlapping with the magnetic fingerprint region 106. The barcode 202 may be printed in regular ink, or in some embodiments may be printed using covert inks such as ultraviolet or infrared "optical" inks that cannot be easily detected by the naked human eye under white light but can be detected and read by using a suitably adapted reading device or by illuminating the tag 102 with one or more particular wavelengths of the electromagnetic spectrum. Magnetic and optical identification features may be positioned at the same position with respect to the scan area by means of using multiple layers, or may be positioned in any other predetermined spatial relationship to each other (including both overlapping and non-overlapping configurations).

FIG. 2A shows a tag 102 with a magnetic fingerprint region 106. A two-dimensional barcode 202 is partially overlapping the magnetic fingerprint region 106 and a plurality of magnetic alphanumeric characters 206 are positioned at the four corners of the two-dimensional barcode 202. Note that although the magnetic fingerprint region 106 is shown in FIG. 2A and FIG. 2B, the fingerprint region 106 may be situated behind an opaque cover layer that the barcode 202 is printed on. Therefore, a user may not actually see the fingerprint region 106. Furthermore, magnetic and optical features may overlap while placed on the same or different layers of a tag 102.

FIG. 2B shows another example of a tag 102 with a magnetic fingerprint region 106. A two-dimensional barcode 202 is overlapping the magnetic fingerprint region 106. The two-dimensional barcode 202 is surrounded by a border 208, and a first fiducial marking 210 is positioned at the upper-right corner of the border 208. A second fiducial marking 212 is positioned on the upper-left corner, adjacent to the second fiducial marking 208. Magnetic alphanumeric characters 214 are positioned adjacent to the border 208.

In some embodiments, a reading element may read overlapping optical and magnetic features of the tag 102. Overlapping and similar terms are to be understood to mean located in the same area, superimposed, or on top of each other. Optical and magnetic features of the tag 102 may overlap on the same or different layers of the tag 102. Reading overlapping optical and magnetic features may allow for a smaller tag 102. It also may provide more accurate correlation between the magnetic and optical features, since the optical features that are used as a reference for fingerprint matching of the magnetic features are physically closer to the magnetic features. An integrated scanning module for reading both the optical and magnetic features is described below. In some embodiments, the optical features of the tag 102 may be read at a distance, using the long range reading portion of the integrated scanning module, while the magnetic features (i.e., the inherent disorder feature of the tag) may be read by a close range or contact reading portion of the integrated scanning module. In some embodiments, at least some of the optical features may be read by both the short- and long-range portions of the integrated scanning module.

FIGS. 3A to 3E show various views of an example tag 102 where the magnetic information and the optical information overlap. In FIG. 3A, the tag 102 may include a cover layer 110 which has an optical barcode (not shown) (herein a "barcode" is taken to include datamatrix codes and other machine readable optical information) printed on its top surface, a magnetic fingerprint region 106 which may be in the form of a layer positioned below the cover layer 110, and an adhesive layer 302 positioned below the magnetic fingerprint region 106. Note that a barcode is shown as the optical marking purely for illustrative purposes. The description that follows for this figure and other figures should be considered to be general and not confined to barcodes.

FIG. 3B shows a top optical view of the tag 102. Optical information in the form of a barcode 202 which has been printed on the surface of the tag 102 may be seen from the top view of the tag 102.

FIG. 3C shows a top magnetic view of the tag 102. If the user is able to take a magnetic image of the tag 102, the user can effectively look "through" the cover layer 110 and the optical information 202 and "see" the magnetic particles 304 or the magnetic fields contained within the magnetic fingerprint region 106.

FIG. 3D shows a top view of the composite image (i.e. the optical and magnetic features superimposed on each other). It is clear that when viewed from the top, the barcode 202 and the magnetic particles 304 overlap each other.

When the tag 102 is scanned by a reading element capable of reading only optical or magnetic features in a given area, FIG. 3E illustrates the resulting scan, wherein, for purposes of illustration, one half of the magnetic fingerprint region 106 is scanned and the other half of the optical barcode 202 is scanned. In the case where the optical barcode 202 is a datamatrix code (as shown), or another two-dimensional barcode symbol, scanning only half of the area may not be sufficient to fully interpret the information encoded in the bar code.

In accordance with an embodiment of the invention, the optical features (i.e., the barcode 202) may be read from a distance, using, for example, conventional methods of reading barcodes. For example, an LED or other light source may be used to illuminate the barcode 202, and an image of the barcode 202 may be projected onto a charge-coupled device (CCD) or a complementary metal-oxide-semiconductor (CMOS) image sensor. The image from the image sensor may then be analyzed to read the information stored in the barcode. Barcode readers of this and other sorts are known in the art, and any far-field barcode reading technology could be used in a portion of an integrated scanning module in accordance with an embodiment of the invention. Barcode readers of this sort are generally suitable for reading a number of one-dimensional bar code symbologies, including (but not limited to) EAN/UPC, RSS, Code 39, Code 128, UCC/EAN 128, ISBN, ISBT, Interleaved, Matrix, Industrial and Standard 2 of 5, Codabar, Code 93/93i, Code 11, MSI, Plessey, Telepen, and postal codes, as well as two-dimensional bar code symbologies, including (but not limited to) Data Matrix, PDF417, Micro PDF 417, Maxicode, QR, Aztec, and EAN.UCC composite.

Figure 4:
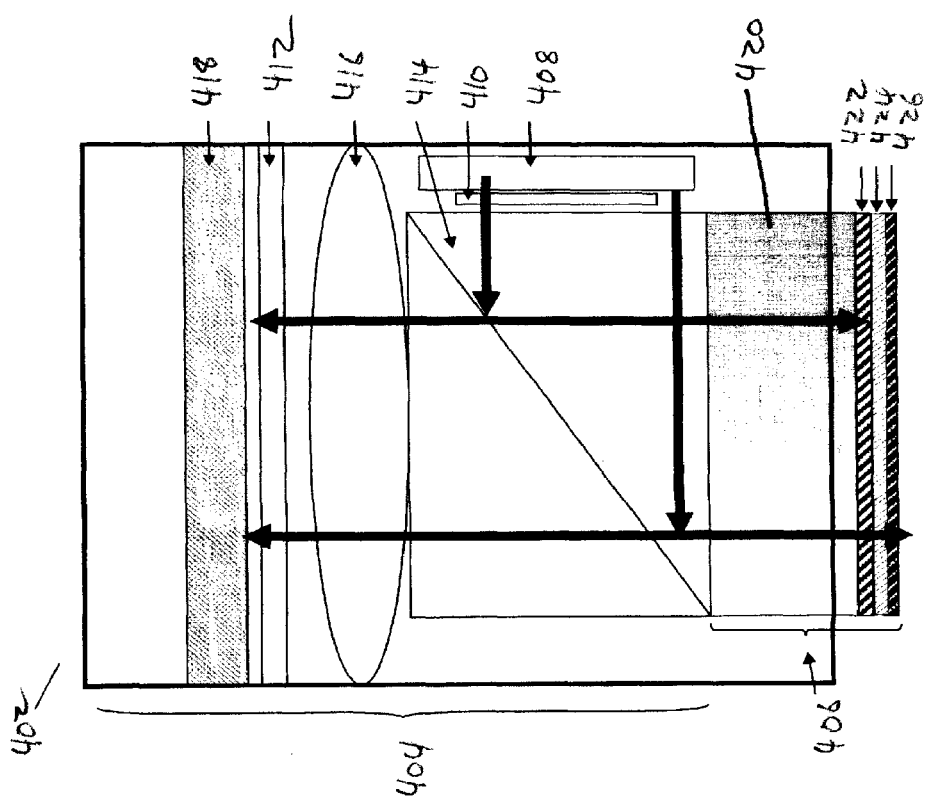
FIG. 4 shows a cross-sectional view of an example reading element for reading magnetic features of a tag.

FIG. 4 shows a cross-sectional view of an example reading element 402 for reading the magnetic features (i.e., the inherent disorder feature) of a tag, such as is shown in FIGS. 1-3. It will be understood that the reading element 402 described with reference to FIG. 4 is for the purpose of explaining the process of reading the magnetic features. A more compact design of such a reading element, combined into an integrated authentication unit along with a reading element for at least a second identification or authentication feature in accordance with an embodiment of the present invention will be shown and described below.

The reading element 402 in FIG. 4 includes an optical processing unit 404 and a magneto-optical substrate 406. The optical processing unit 404 includes a plurality of components, the components including a light source 408, two polarizers 410 and 412, a beam splitter 414, a lens system 416 (although just one lens is shown in FIG. 4, it will be understood that, in general, a series of lens elements may be used to achieve a good quality image), and an optical detector 418, for example a CCD or CMOS image sensor.

The configuration shown and described in relation to FIG. 4 is merely for illustration and the configuration can vary. For example, the positioning of the polarizer 412 and the lens system 416 can be interchanged or the polarizer 412 can be placed within the lens system 416. Further, some of the lenses within the lens system 416 may be positioned in front of the beam splitter 414, or the beam splitter 414 may be within the series of lens within the lens system 416. Additionally, if the light source 408 emits polarized light, then only one polarizer might be needed, or it might be possible to use one polarizer combined with a polarizing beam splitter, for example.

The magneto-optical substrate 406 comprises an optically transparent substrate 420 and a plurality of magneto-optic coatings such as a first coating layer 422, a second coating layer 424 and a protective layer 426. Various suitable arrangements are possible. For example, as disclosed in U.S. Pat. No. 5,920,538, the optically transparent substrate 420 can be a mono-crystalline garnet (such as a gadolinium gallium garnet which may further contain other components such as scandium), the first coating layer or magneto-optic film 422 may be a Faraday rotator (comprising, for example, a ferrite-garnet film), the second coating layer or reflective layer 424 can be a Kerr rotator (comprising, for example, gadolinium ferrite), and the second coating layer 424 may be further coated with a reflective or transparent protective layer 426.

The light source 408 may be a polarized source or a non-polarized source. Some examples of a polarized source include certain types of lasers, and some examples of a non-polarized light source include a light emitting diode (LED). Further, the light source 408 may be monochromatic, although other options, such as a white light source, may also be suitable. Light from the light source 408 passes through the first polarizer 410 and is then incident on the beam splitter 414. A significant proportion of the light is reflected by the beam splitter 414 towards the magneto-optical substrate 406. At least a portion of this light is reflected by one or more of the magneto-optic coatings 422, 424 and 426 and travels back towards the beam splitter 414. A significant proportion of the light passes through the beam splitter 414, travels through the lens system 416 and the second polarizer 412 before it reaches the optical detector 418 which captures an image representative of the magnetic fields present at the magneto-optic coating layers 422, 424, and 426. Note that although in FIG. 4 the light path is generally represented arrows, this is not intended to imply that the light only travels along that single path. Generally, the light may be over an area wide enough to image the desired area of the magneto-optic substrate 406. Note further that the second polarizer 412 is rotated with respect to the polarization of the incoming light (in FIG. 4 the "polarization of the incoming light" means the polarization immediately after the light has passed through the first polarizer 410). The second polarizer 148 may be tuned with respect to the polarization of the incoming light (or vice versa) to ensure the maximum image contrast depending on the magnetic fields being measured. Note that when a polarized source is used, only one polarizer is needed.

All images herein are not to scale. For example, the magneto-optical substrate shown in FIG. 4 (and other figures) is often thickened with the rest of the figure in order to allow clear demarcation of the various coating layers.

The protective layer 426 serves to protect the first coating layer or magneto-optic film 422 and the second coating layer or reflective layer 424 from any damage. The protective layer 426 may be a hard thin coating such as diamond like carbon (DLC) or tetrahedral amorphous carbon (ta-C), or it may be transparent such as aluminum oxide (Al.sub.2O.sub.3), but is not so limited. The thickness of the protective layer 426 is in the range of a few nanometers to a few microns, depending on the chosen material and its internal stresses, but is not so limited.

The components in the optical processing unit 404 and the layer arrangement in the magneto-optical substrate 406 may have a fixed spatial relationship with respect to each other. By this we mean that at least the main optical components (for example, the optical detector 418, the lens system 416, the polarizers 410 and 412, the beam splitter 414 and the magneto-optical substrate 406) are all fixed with respect to each other such that they may be considered as forming a solid unit, i.e. the reading element, 402.

The reading element 402 may use magneto-optical reading of the tag 102 wherein light is internally reflected inside the reading element 402 by magneto-optical substrate 406. This means that the light being used to analyze the magnetic fields does not reflect off the surface of the tag 102. If this is the case, because the magneto-optical substrate 406 allows little to no light to pass through, optical information located on the surface of tag 102 cannot be read.

Alternatively, at least some light passes through the first coating layer 422, the second coating layer 424 and the protective layer 426. Assuming that the surface of the tag 102 is sufficiently reflective, light will also be reflected from at least some portions of the surface of the tag 102 and pass back through the reading element 402 to be captured by the optical detector 150. That is, at least a portion of light is reflected from the surface of the tag 102 and not internally reflected within reading element 402. Assuming that at least portions of the tag 102 are sufficiently reflective, the optical detector 150 will detect a combination of the light as altered by the magnetic features and optical features.

Further alternative arrangements may be used to read both the magnetic and optical features using the same reading element. For example, different wavelengths of light may be used for interpreting the barcode and the magnetic features. If the magneto-optical substrate works preferentially in the green domain, then that domain can be used to read the magnetic information, while the red domain, for example, could be used to interpret the optical information. This kind of system may be improved further by using two different light sources in the reading element—the green light source is polarized for example while the red light source is left unpolarized. Further, a wavelength selective second coating layer 424 could be used, such as a dichroic or dielectric mirror. Dichroic and dielectric mirrors are thin film mirrors that reflect a selected wavelength of light (or range of wavelengths) while allowing the other wavelengths to be transmitted through the mirror. Thus, the second coating layer 424 could include a wavelength selective mirror that reflects green light but allows red light to be transmitted. This configuration allows the red domain of the image to be an optical image, while the green domain is an image of the magnetic features.

Referring now to FIG. 5, a first illustrative embodiment of an integrated authentication unit 500 in accordance with an embodiment of the invention is described. An optical processing unit (such as a CMOS image sensor) 520 is mounted on a printed circuit board (PCB) 510. There is a beamsplitter 540 mounted in front of the optical processing unit 520 at 45.degree. to the surface of the imaging. Light that passes through the beamsplitter 540 from above comes from the optics which are designed to obtain an optical image of a remote object or surface. These optics include a series of lens elements 570, 571 and 572 and a pinhole 560. The remote object or surface is preferably illuminated by lighting elements 550 and 551 (these lighting elements could, for example be light emitting diodes, "LED"s).

Light that is reflected towards the optical processing unit 520 by the beamsplitter 540 comes from the magneto-optic/optic imaging portion of the authentication unit 500 that is designed to obtain magnetic and optical information (e.g., which may contain bar-code information, fiducial marks, etc.) from an object or surface which is in contact or in close proximity to the magneto-optical substrate 580. This portion of the authentication unit comprises a first polarizer 590 situated in front of a lighting element 553 (which could be an LED). It may also comprise a second lighting element 552 (which may be an LED of a different wavelength than the lighting element 553). A mirror surface 545 (which could alternatively be a prism) is used to redirect light. This portion of the authentication unit 500 also comprises a series of lens elements 573, 574 and 575 and a pinhole 561. There is also a second polarizer 591 and the magneto-optical substrate 580. In addition, the authentication unit 500 has a protective housing 530 which both protects the various components of the housing and also ensures that at least some of the components are kept at a substantially fixed spatial relationship to each other.

Note that the beamsplitter 540 could be any type of beamsplitter, e.g. a plate beamsplitter or a cube beamsplitter. Alternatively, it could be replaced by a switchable mirror, and similar effects could be obtained using various combinations of switchable mirrors, beamsplitters, electronic shutters, prisms, etc. This configuration enables the authentication unit 500 to read optical information (such as barcodes) remotely and also to read magnetic/optical information (i.e., an inherent disorder feature) at close proximity to or in contact with magneto-optical substrate 580.

In addition, in FIG. 5 and subsequent illustrations, it is contemplated that the outer surface of the magneto-optical substrate 580 may be coated with various layers including faraday rotating layers, protective layers and mirror layers. The mirror layer may be a dichroic (or dielectric) mirror layer, such that one range of wavelengths of light are able to pass through the coating while another range of wavelengths are reflected by the coating. For example, the dichroic mirror coating may be chosen to substantially transmit light with wavelengths longer than .about.590 nm (e.g. orange/red light), while substantially reflecting light at wavelengths below .about.590 nm (e.g. yellow/green/blue/violet light). By controlling the light emitted from the lighting elements 552 and 553 this dichroic mirror coating is able to provide clean magnetic and optical images of the same substrate simultaneously. For example, if the lighting element 552 (which preferentially has no polarizer in front of it) is chosen to be red (i.e. wavelength above .about.590 nm) then this unpolarized red light will pass through the dichroic mirror and reflect off the surface or tag which is in front of the magneto-optical substrate. This reflected light will again pass through the dichroic mirror and be directed to the optical processing unit 520. Consequently, red light hitting the optical processing unit 520 (from this optical path) will contain only optical information about the surface or object in front of the magneto-optical substrate 580. If the lighting element 553 is chosen to emit green light (wavelength less than .about.590 nm), this green light will be polarized by polarizer 590 and will be reflected by the dichroic mirror layer. Therefore, this reflected green light hitting the optical processing unit 520 will not carry any optical information about the surface or object in front of the magneto-optical substrate 580. Instead, the green light hitting optical processing unit 520 carries magnetic information about the surface or object in front of magneto-optical substrate 180.

This "information" is enhanced by rotating the polarization angle of the polarizer 591 with respect to the rotation of the polarizer 590. For example, let us assume the idealized case where the magneto-optical substrate locally rotates the reflected green light by 5.degree. clockwise if a strong local magnetic north field is present at that point, but locally rotates the reflected green light by 5.degree. anti-clockwise if a strong local magnetic south field is present. If no local magnetic field is present, then the reflected green light maintains its polarization angle and is not rotated. Assume, for example, that the polarization angle of the polarizer 591 is rotated clockwise by 85.degree. with respect to the polarizer 590. If no magnetic field is present then the reflected green light hitting the polarizer 591 will be polarized at 85.degree. degrees from the polarization angle of the polarizer 591, and consequently very little light will pass through. If, however, there was a local south field, the reflected green light will have been rotated by 5.degree. anti-clockwise, and consequently when it hits the polarizer 591, it will be polarized at 90.degree. to the polarizer 591. This means that very little, if any light will pass through. If, however, a local north field were present, the reflected green light would be rotated by 5.degree. clockwise, and when it hits the polarizer 591, it would therefore be polarized at only 80.degree. from the polarization direction of the polarizer 591. Therefore, north magnetic fields would appear as bright spots on an image taken by the optical processing unit 520, south magnetic fields would appear as local dark/black regions, and the non-magnetic areas would appear as a dark (but not quite black) background. Using this kind of configuration, the reflected green light can be used to obtain magnetic information from a surface or substrate in contact or close proximity with the magneto-optical substrates 580.

Note that certain optical processing units, such as CMOS sensors, are well-suited to split the image into red, green, and blue components since their surface is an array of individual red, green, and blue light sensors. Therefore images taken with such CMOS sensors are inherently split into their various red, green, and blue components (and, in fact, full color images from such sensors are a somewhat artificial combination of these three components). Therefore, if a CMOS sensor is used for the optical processing unit 520, the images from red light and green light are automatically split, due to the nature of the CMOS sensor. It will be understood that the measured red, green and blue signals from the CMOS may not be a pure representation of each of the red, green and blue light components respectively, and some mathematical subtraction/normalization steps may be needed. These techniques are well-known as the effect is inherent in many CMOS sensors, so their manufacturers typically provide documentation on how to achieve this.

One problem which may arise from this, however, is cross talk between the signals from the two different light paths (the one which is adapted to optically image remote surfaces and objects and the other which is adapted to image magnetic/optical surfaces and objects which are in front of the magneto-optical substrate 580). This can be solved in various ways, including some that are discussed below with respect to alternative embodiments. Among the other ways to deal with this is, for example, to have the lighting elements 550 and 551 emitting green light, and to have the lighting elements 552 and 553 switched off, when it is desired to read a remote optical surface or object. With this situation, and assuming that the magneto-optical substrate 580 is coated with the dichroic mirror layer described above, substantially all the green light that reaches the optical processing unit 520 will be from the desired remote imaging optical path. For the purposes of imaging the substrate in this case, the red and other light can be ignored, as it will contain cross-talk from the optical path containing the magneto-optical substrate 180. When it is desired to obtain information from the optical path that includes the magneto-optical substrate, then the lighting elements 550 and 551 may be switched off, and the lighting elements 552 and 553 can be used (simultaneously or sequentially) to illuminate the surface/object in front of the magneto-optical substrate 580. A shutter (not shown in FIG. 5) may be used to close off the pinhole 560. Alternatively, as described previously, the beamsplitter 540 could actually be a switchable mirror which is activated to become completely reflective.

Note that in FIG. 5 and other illustrations, various non-key components are purposefully left out in order to facilitate clear description of the key components. An example of a component which is purposefully omitted in FIG. 5 is a flex circuit/cable to enable the printed circuit board 510 to communicate with another mother board in the device in which the authentication unit 500 is housed. Also, a variety of modifications could be made to the design. For example, although lighting elements 550, 551, 552, and 553 are shown as single lighting elements, it will be understood that multiple lighting elements could be used in place of each of these lighting elements. Further, different types of lighting, such as ring lighting could also be used. Further, an off-axis design, such as is shown in FIGS. 7A and 7B, or other off-axis lighting could be used, obviating the need to use the beamsplitter 540.

FIGS. 6A and 6B show another example embodiment of an authentication unit 600, able to read optical information (such as barcodes) remotely and also to read magnetic/optical information at close proximity to or in contact with magneto-optical substrate 580. In this embodiment, the mirror 545 (shown in FIG. 5) is absent, and consequently the optical paths for reading remote optical information and contact/proximate magnetic/optical information are at 90.degree. from each other. The authentication unit 600 further comprises an outer housing 630, spring 610 and sensor element 620.

In FIG. 6A, the authentication unit is shown in its standard position, i.e. where the spring element 610 is extended and the protective housing 530 and its contents are pushed by the spring 610 away from the sensor element 620. In this position, the optics, which are designed to obtain an optical image of a remote object or surface (which comprise the same lens elements and lighting elements, etc. as described with reference to FIG. 5), are in position to image remote objects/surfaces. As can be seen in FIG. 6A, in this position the pinhole 560, and lighting elements 550, 551 are aligned with holes or gaps in the outer housing 630. This allows lighting and imaging of a remote object or surface to occur.

FIG. 6B shows the authentication unit 600 being pushed against a tag 640. The tag 640 comprises at least one set of identification features which are magnetic or from which a magnetic signal can be derived. The tag 640 is attached to an object of value 650. When the authentication unit 600 is pushed against the tag 640, the spring 610 compresses until finally, with enough pushing force, the sensor 620 is activated due to proximity or contact with the housing 530. Sensor element 620 can be any kind of proximity or contact sensor, switch or contact button, for example a button which is activated upon contact with the housing 530. If the sensor element 620 is not a mechanical or push button "proximity sensor", but an electronic proximity sensor that senses the distance of the housing 530, it may be set to be activated when the housing reaches a certain predefined distance from it. At this point, the optics for imaging remote surfaces or objects are blocked by the outer housing 630. As can be seen, the pinhole 560 is blocked by the outer housing 630, as are the lighting elements 550 and 551. Consequently, in this position, substantially all the light reaching the optical processing unit 520 comes from the optics designed to obtain magnetic/optical information from an object or surface which is in contact or in close proximity to the magneto-optical substrate 580.

FIGS. 7A and 7B show another example embodiment of an authentication unit 700. As shown in FIG. 7A, this unit employs an off-axis optical design where the optical path for reading of contact/proximate magnetic/optical information does not correspond to the axis of the front lens elements 573, 574 and the magneto-optical substrate 580. Illustrative optical paths 710 for light reflecting from the magneto-optical substrate 580 towards the optical processing unit 520 are shown in FIG. 7B. As can be seen, the optical path for remote optical imaging (light passing through the pinhole 560) is arranged at an acute angle to the optical path for reading of contact/proximate magnetic/optical information. The configuration illustrated in FIG. 7 can be modified in various ways. For example, shutters, switchable mirrors, etc. can be employed to ensure that there is substantially no cross-talk between the remote and proximate imaging systems. In addition, different acute angles or other modifications can be made.

Figure 8:
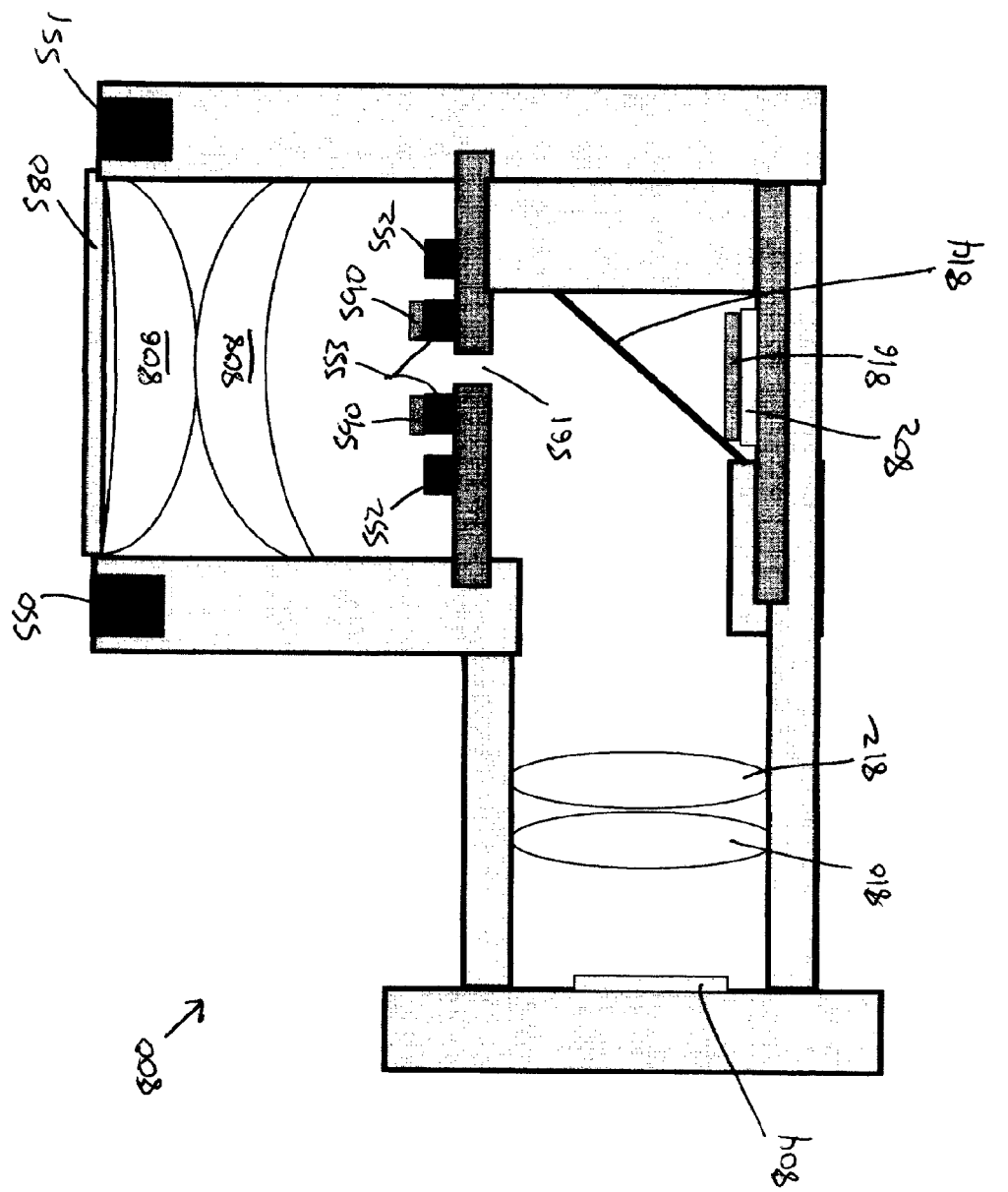
FIG. 8 shows a cross-sectional view of yet another example of an authentication unit in accordance with an embodiment of the invention.

FIG. 8 shows a further example embodiment of an authentication unit 800, which uses two optical processing units 802 and 804 (which may, for example, be CMOS image sensors) to read both near-field and far-field authentication and/or identification features in the same integrated unit. The authentication unit 800 further includes lenses 806 and 808, which are in both the near-field and far-field optical paths, and lenses 810 and 812, which are in only the far-field optical path. A beam splitter 814 (which may, optionally, be a switchable beam splitter or switchable mirror) directs light to both the optical processing unit 802 (and through a polarizer 816), for near-field (i.e. inherent disorder feature) reading, and the optical processing unit 804, for far-field reading of identification or authentication features such as bar codes.

When the authentication unit 800 is being used for near-field reading of both optical and magnetic features, the lighting elements 552 and 553 may be switched on, and the lighting elements 550 and 551 may be switched off. Light from the lighting elements 553 passes through the polarizers 590, and is reflected off of the magneto-optical substrate 580 (which includes a dichroic or dielectric mirror layer, as discussed above), carrying information on the magnetic features that are near the magneto-optical substrate 580. At least a portion of this reflected light passes through the beam splitter 814, and then through the polarizer 816, to be read by the optical processing unit 802. Light from the lighting elements 552 passes through the magneto-optical substrate 580, and is reflected from the surface of the tag or object that is being read. At least a portion of this light passes through the beam splitter 814, and then through the polarizer 816, and is also read by the optical processing unit 802. The positions of many of the components in the illustrations are for convenience and clarity only. For example polarizer 816 is shown as being attached to the front surface optical processing unit 802 but it will be clear to anyone skilled in optics that this may not be the best position for it as any defects or scratches on the polarizer will be sharply imaged by the optical processing unit. Having some gap may be a better solution but it is more difficult to illustrate clearly.

When the authentication unit 800 is being used for far-field reading, the lighting elements 550 and 551 may be switched on, and the lighting elements 552 and 553 may be switched off. Light is reflected from the feature being read at a distance (e.g., a bar code), and passes through the magneto-optical substrate 580. At least a portion of this light is reflected by the beamsplitter 814, and passes through lenses 810 and 812 to be read by the optical processing unit 804.

Figure 9A:
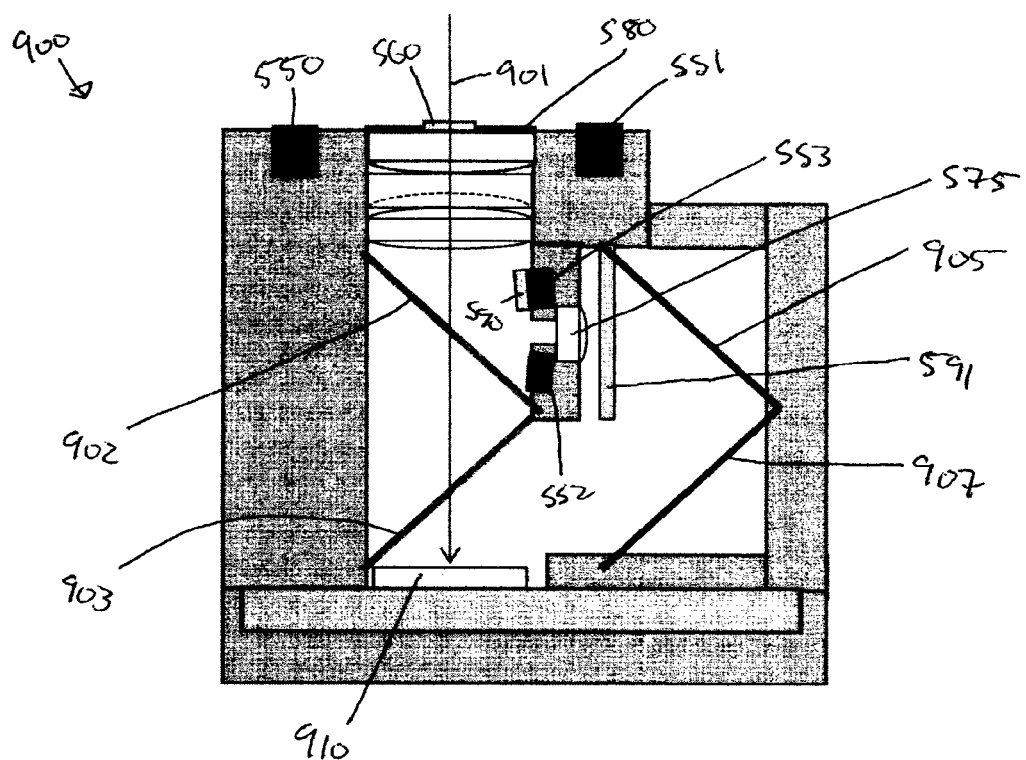
FIGS. 9A and 9B show cross-sectional view of another example of an authentication unit in accordance with an embodiment of the invention.
Figure 9B:
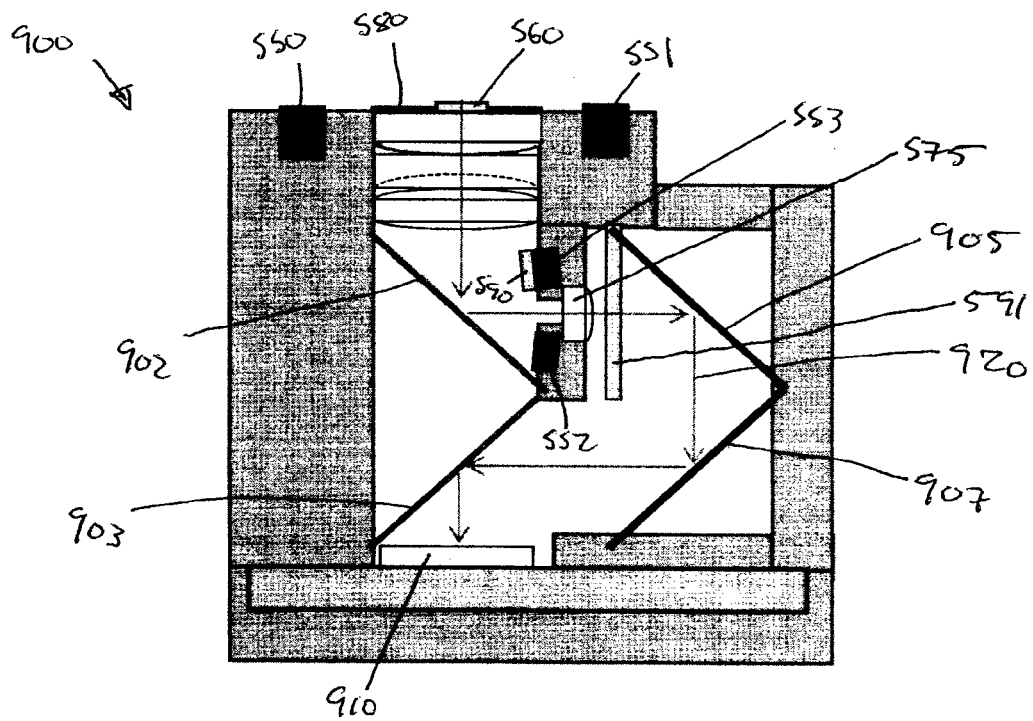

FIGS. 9A and 9B show a further embodiment of an authentication unit 900, in which dichroic mirrors 902 and 903, and mirrors 905 and 907 direct light from far-field reading along the optical path 901 as shown in FIG. 9A, and light from near-field reading along optical path 920 as shown in FIG. 9B.

When the authentication unit 900 is being used for far-field reading, as shown in FIG. 9A, the lighting elements 550 and 551 may be switched on, and the lighting elements 552 and 553 may be switched off. The dichroic mirrors 902 and 903 are configured such that they permit the light from the lighting elements 550 and 551 to pass through (to be projected onto the optical processing unit 910), while reflecting the light from the lighting elements 552 and 553.

When the authentication unit 900 is being used for near-field reading, as shown in FIG. 9B, the lighting elements 552 and 553 may be switched on, and the lighting elements 550 and 551 may be switched off. Light from the lighting elements 552 and 553 reflects off of a dichroic or reflective layer of the magneto-optical substrate 580, and is reflected by the dichroic mirror 902 so that it passes through the lens system 575 and the polarizer 591 before being directed by the mirrors 905 and 907 and the dichroic mirror 903 onto the optical processing unit 910.

Although an optional pinhole 560 is shown in the magneto-optical substrate 580 in the embodiment shown in FIGS. 9A and 9B, it will be recognized that through use of a dichrioc mirror layer in the magneto-optical substrate 580, particular wavelengths of light may pass through the magneto-optical substrate 560 during far-field reading, and the pinhole 560 may be absent. It will be understood that the embodiment of FIGS. 9A and 9B is an example, and may be modified in a variety of ways, and/or combined with elements described with reference to other embodiments.

Figure 10A:
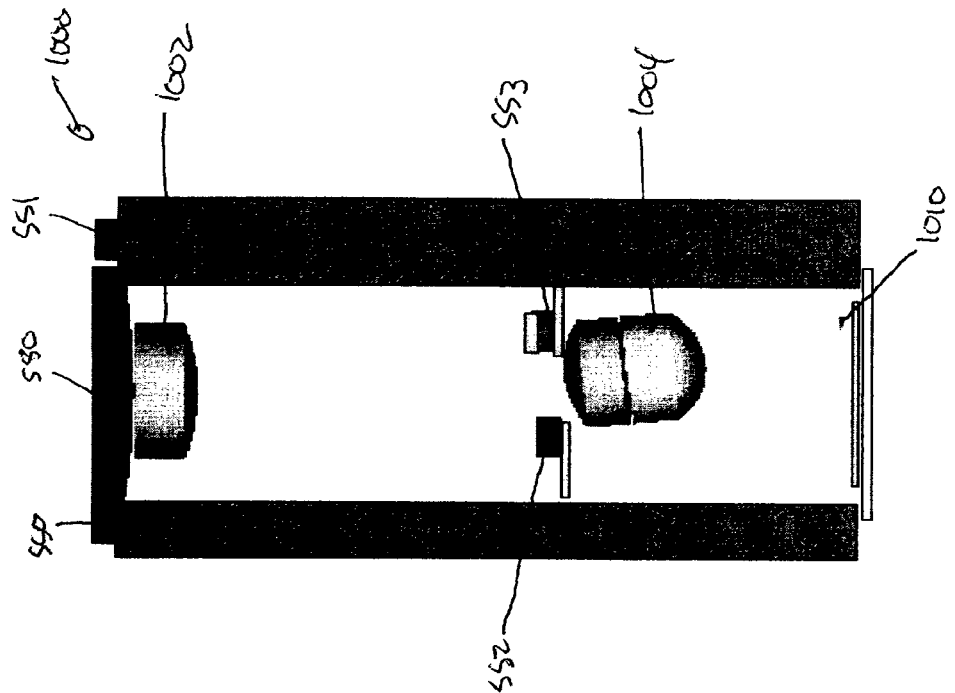
FIGS. 10A and 10B show cross-sectional views of a further example of an authentication unit in accordance with an embodiment of the invention that uses mechanical movement of a lens system to switch between reading a near-field inherent disorder feature and reading a far-field feature.
Figure 10B:
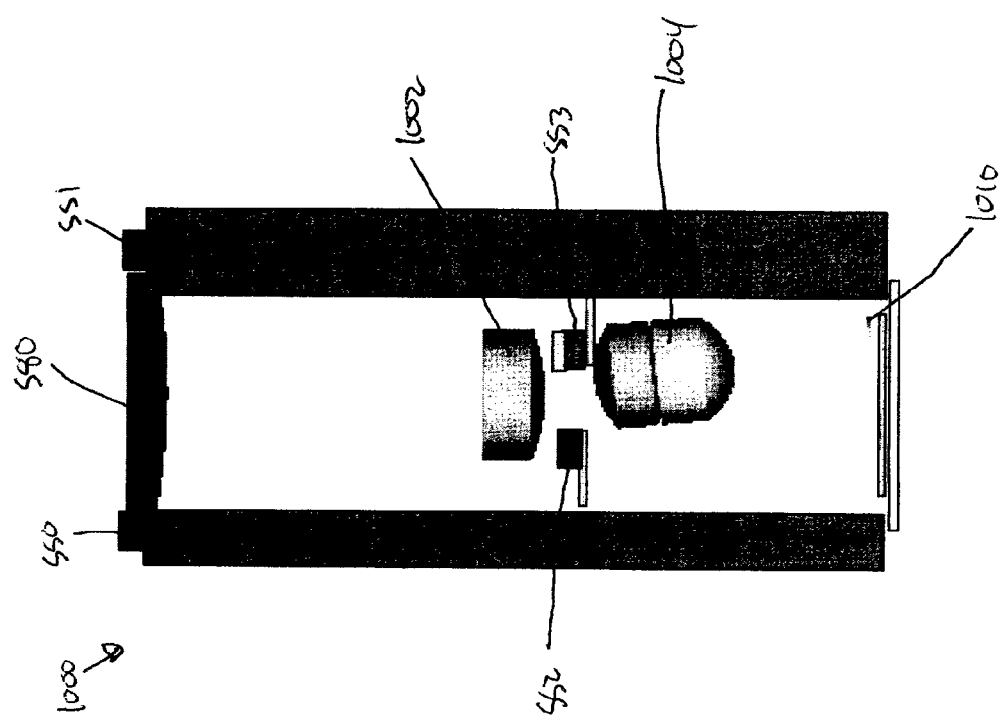

Mechanical means can also be used to switch between near-field reading of inherent disorder features and far-field reading of other features. FIGS. 10A and 10B show an embodiment of an authentication unit 1000 in which a position of the lens system 1002 determines whether the system is being used for near-field or far-field reading.

When the authentication unit 1000 is being used for far-field reading, as shown in FIG. 10A, the lighting elements 550 and 551 may be switched on, and the lighting elements 552 and 553 may be switched off. The lens system 1002 may be mechanically positioned at a location relatively distant from the magneto-optical substrate 580. The location of the lens system 1002 may be predetermined to permit far-field scanning at a predetermined distance, or may be adjustable over a range, to permit the system to focus at a range of distances for far-field scanning Additionally, an automatic focus system (not shown) may be used to determine an appropriate position for the lens system 1002 during far-field scanning Light passing through the lens system 1002 is focused by a second lens system 1004 onto an optical processing unit 1010.

When the authentication unit 1000 is being used for near-field reading, as shown in FIG. 10B, the lighting elements 552 and 553 may be switched on, and the lighting elements 550 and 551 may be switched off. The lens system 1002 may be mechanically positioned at a location relatively near the magneto-optical substrate 580, such that light reflected from the magneto-optical substrate 580 (i.e., light carrying information on the magnetic fields near the magneto-optical substrate 580), as well as from an object in close range from or in contact with the magneto-optical substrate 580 is properly focused onto the optical processing unit 1010.

FIGS. 11A and 11B show the path of light beams 1102 and 1104 passing through the lens systems 1002 and 1004 of the authentication 1000 as described above with reference to FIGS. 10A and 10B. FIGS. 11A and 11B show only relevant optical elements, the optical processing unit 1010, onto which the beams are focused, and the magneto-optical substrate 580, onto which beams are focused for near-field reading, as shown in FIGS. 10B and 11B. As can be seen in FIG. 11A, when far-field reading is occurring, the lens system 1002 is at a position relatively distant from the magneto-optical substrate 580, and focuses beams 1102 from a distance (shown in the figure only from passing through the magneto-optical substrate 580) onto the optical processing unit 1010. In FIG. 11B, when the system is configured for near-field reading, the lens system 1002 is positioned relatively near the magneto-optical substrate 580, and can focus beams 1104 from the magneto-optical substrate 580 onto the optical processing unit 1010.

Figure 12A:
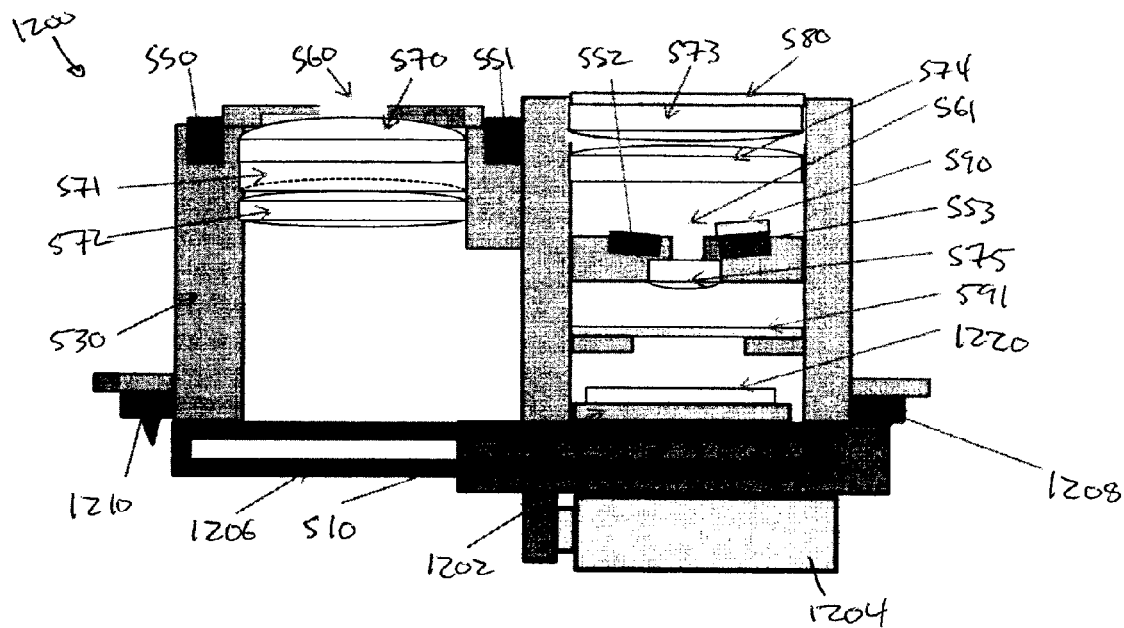
FIGS. 12A and 12B show cross-sectional views of another example of an authentication unit in accordance with an embodiment of the invention.
Figure 12B:
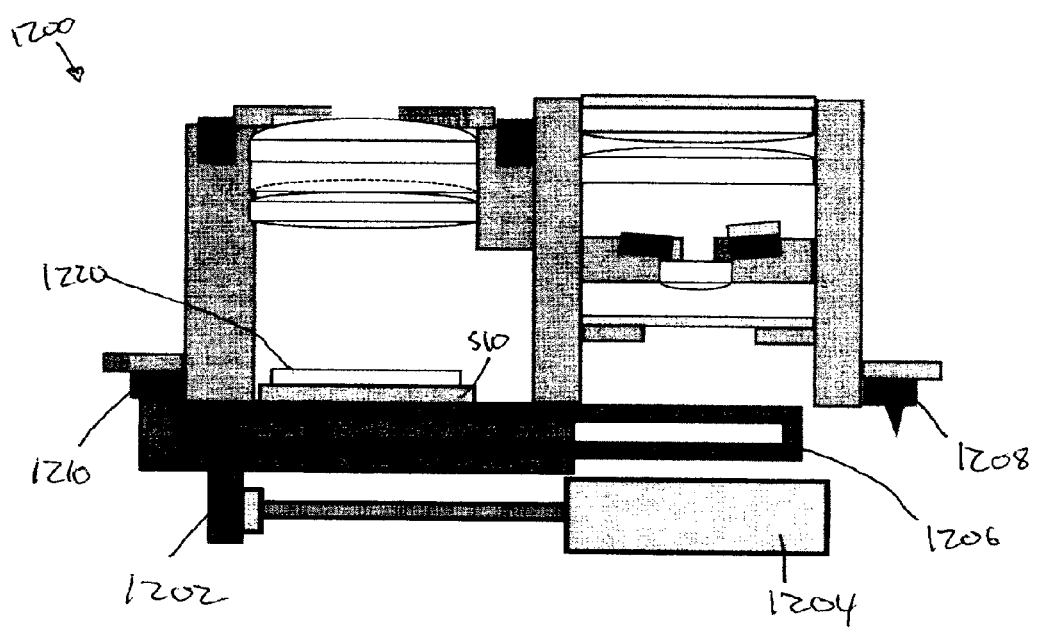

Other mechanical means can also be used, as seen in the embodiment shown in FIGS. 12A and 12B. In the authentication unit 1200 show in FIG. 12A, an electro-mechanical component such as a solenoid or motor is used to change the position of the optical processing unit 1220. The optical processing unit 1220 is mounted on the PCB 510, which in turn is mounted on a moving structure 1202. the solenoid 1204 moves the moving structure 1202 within a sliding profile 1206, between a position in which the optical processing unit 1220 is used for near-field reading of an inherent disorder feature, and a position in which the optical processing unit 1220 is used for far-field reading of another feature, such as a bar code. Detector switches 1208 and 1210 may be used to determine the position of the optical processing unit 1220, and to stop the solenoid 1204 when the optical processing unit 1220 is in an appropriate position. The solenoid 1204 may be activated to move the optical processing unit between the position for reading a near-field inherent disorder feature and reading a far-field feature, for example, based on a scan trigger button on the scan device, or based on a mode selection on the scan device.

When used for near-field reading of an inherent disorder feature, as shown in FIG. 12A, the optical processing unit 1220 (mounted on PCB 510) is in a position that permits it to read an inherent disorder feature at a close range. FIG. 12B shows the optical processing unit 1220 in a position that permits it to be used for reading a far-field feature, such as a bar code.

Figure 13A:
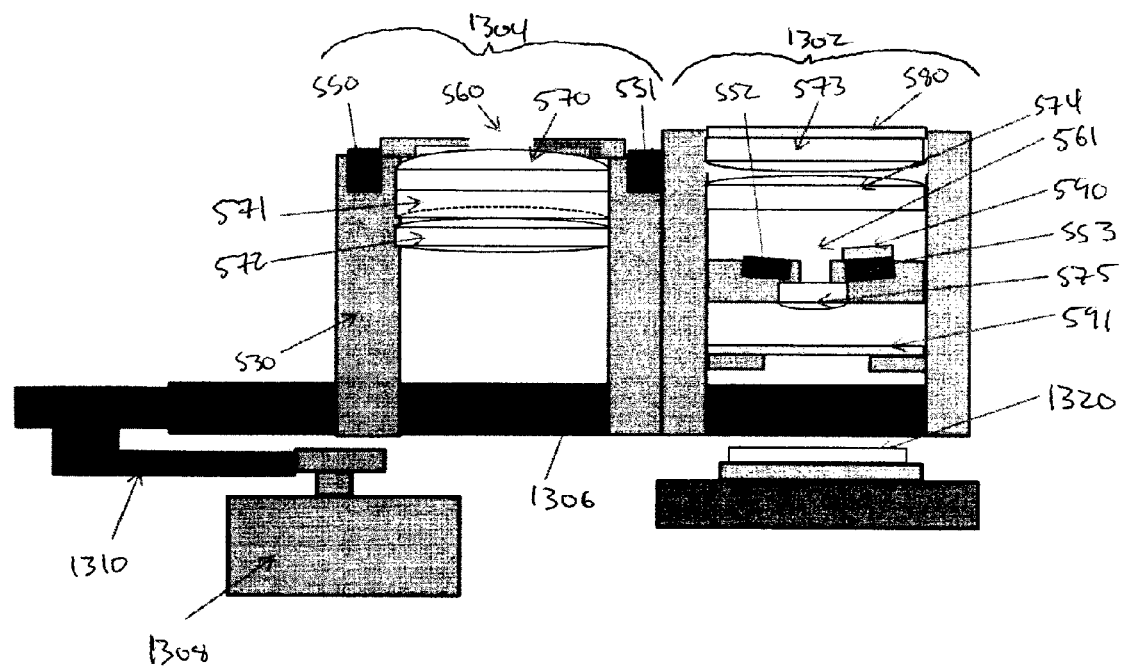
FIGS. 13A-13D show views of yet another example of an authentication unit in accordance with an embodiment of the invention.
Figure 13B:
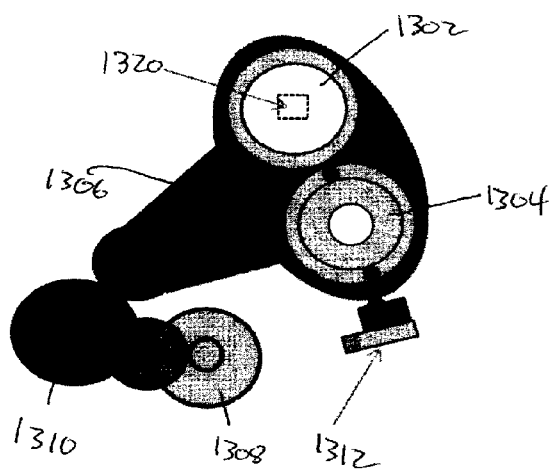

FIGS. 13A-13D show another embodiment, in which rotational movement is used to position an optical arrangement for near-field or for far-field scanning over an optical processing unit 1320. As shown in FIGS. 13A and 13B, the near field portion 1302 and far field portion 1304 of the authentication unit 1300 are disposed on a rotatable body 1306. The rotatable body 1306 is rotated by a stepper motor 1308 and gear sets 1310. For near-field scanning of inherent disorder features, as shown in FIGS. 13A and 13B, the near field portion 1302 is rotated to be over the optical processing unit 1320. A detector switch 1312, as shown in FIG. 13B may be used to determine a "home" position for the device.

Figure 13C:
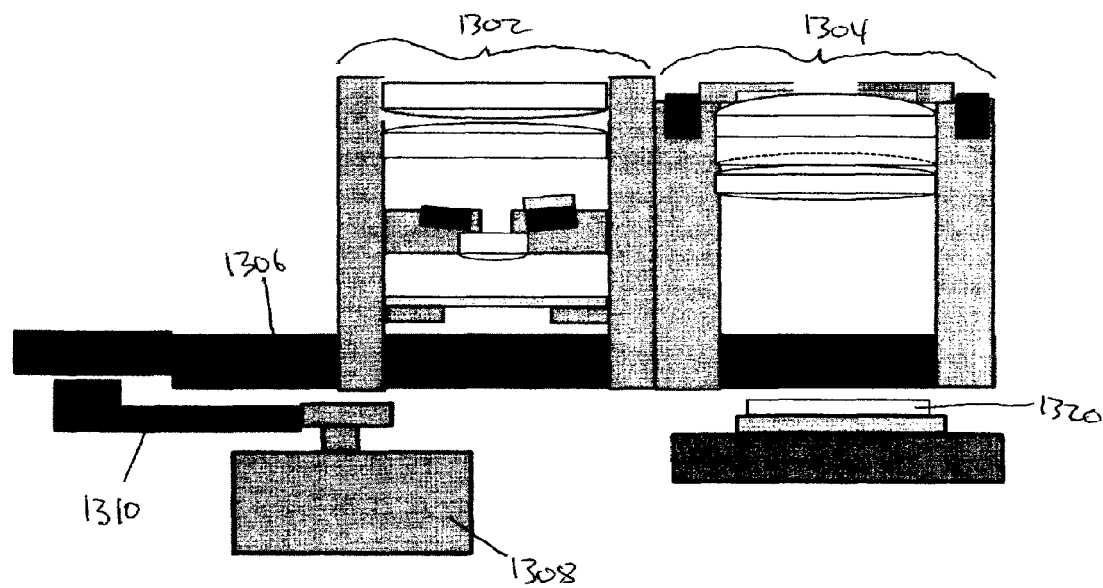
Figure 13D:
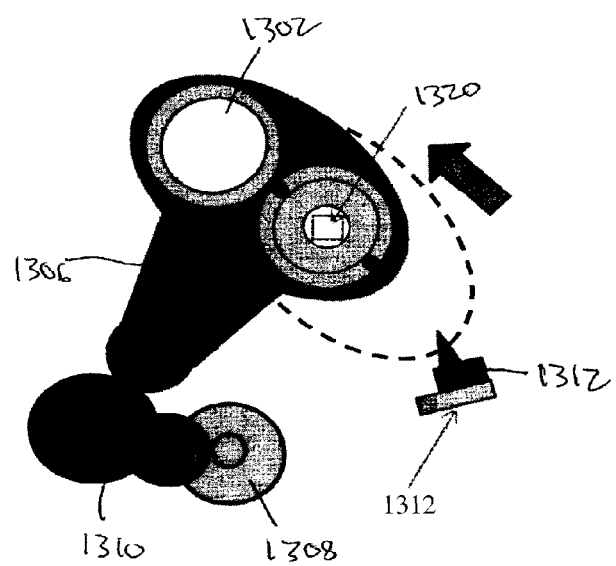

As shown in FIGS. 13C and 13D, for far field scanning—of a barcode, for example, the far field portion 1304 may be rotated into a position over the optical processing unit 1320. The stepper motor 1308 may be used to control the rotation of the rotatable body 1306 to position the far field portion 1304 at the correct position over the optical processing unit 1320.

As can be seen in each of the example embodiments described above, a near-field inherent disorder-based reader (in these examples, a reader for reading magnetic features) is combined within the same integrated scanning module with a far-field reader for another type of feature, such as an optical bar code reader. By placing the two readers within the same integrated module, various parts that are common to both readers can be shared, such as the optical processing unit 520 in the embodiments described with reference to FIGS. 5-7, 9, 12, and 13, or portions of the optical path in the embodiment of FIG. 8, or both. Further an integrated scanning module containing at least an inherent disorder reader and a second reader for another authentication or identification feature provides a convenient unit, containing substantially all of the authentication/identification reading capabilities that are used for a wide variety of applications in a form that can be easily integrated into other devices designed for these applications.

Figure 14A:
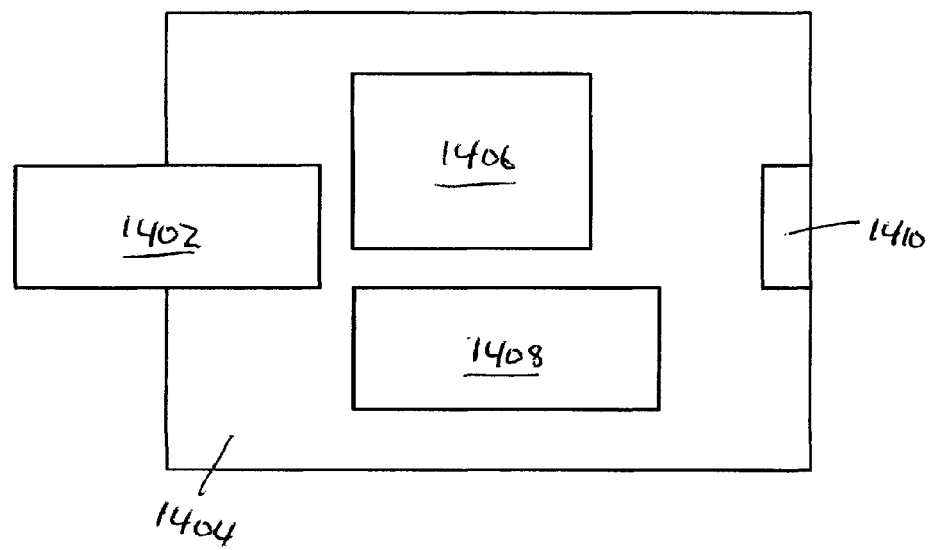
FIGS. 14A and 14B show integrated scanning devices including authentication units in accordance with embodiments of the invention.
Figure 14B:
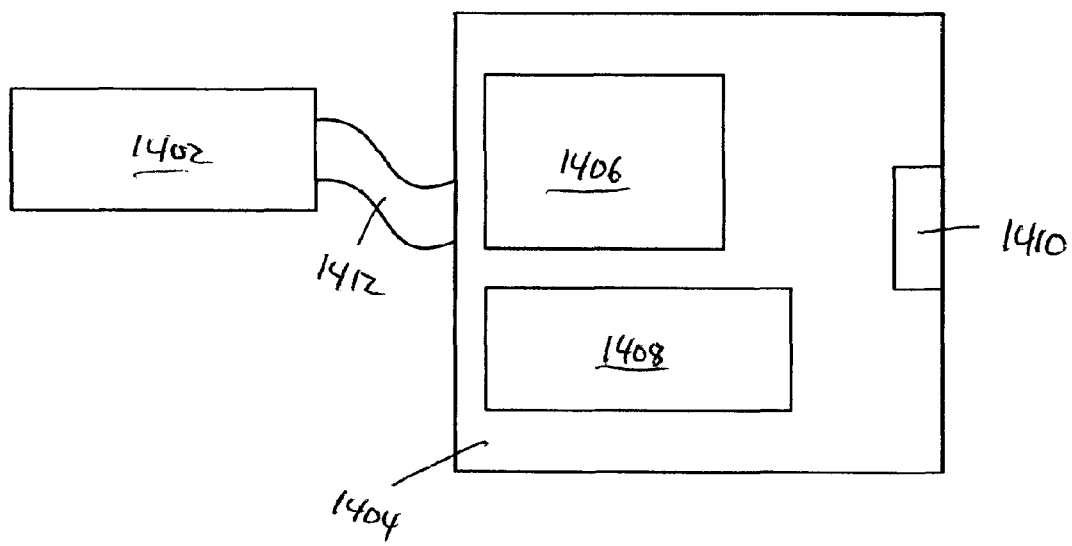

In addition to the components described with reference to the example embodiments above, additional electronics may be useful, to receive signals from the optical processing units and output a signal indicative, e.g., of the data encoded in a barcode or in an inherent disorder feature. As shown in FIGS. 14A and 14B, in some embodiments, an integrated scanning module 1400 may include an authentication unit 1402, such as the authentication units described with reference to FIGS. 5-13, and a PCB 1404 which includes further electronic components that are used to control the authentication unit 1402, and to decode and communicate the signals received by the authentication unit 1402. In these example embodiments, the PCB 1404 includes a microcontroller 1406, memory 1408, and an interface 1410. The memory 1408 and interface 1410 are connected to the microcontroller 1406 via a bus (not shown). The memory 1408 may store instructions that can be executed by the microcontroller 1406, as well as data received from the authentication unit 1402, and data for use during decoding or communicating with external devices. The interface 1410 may be, for example, a standard communication interface with well-defined communication protocols, such as an RS232 interface, a USB interface, or an I.sup.2C interface. The interface 1410 is used to communicate with an external device into which the scanning module 1400 is integrated. In some embodiments, power for the scanning module 1400 may be provided through the interface 1410. In other embodiments, power may be provided to the scanning module 1400 through a separate power connector (not shown).

As shown in FIG. 14A, the authentication unit 1402 may be directly connected to the PCB 1404 to form the complete integrated scanning module. Alternatively, as shown in FIG. 14B, the authentication unit 1402 may be connected to the PCB 1404 via a cable 1412. The cable 1412 is shown in FIG. 14B as a ribbon cable, though it will be understood that other types of cables, including a flex cable or flex circuit, may be used. Alternatively, the authentication unit 1402 and PCB 1404 may be connected in other ways, such as by providing pads (not shown) on either a PCB associated with the authentication unit 1402 or on the PCB 1404 for a ball-grid array or other known connection to be formed between the authentication unit 1402 and PCB 1404.

Figure 15:
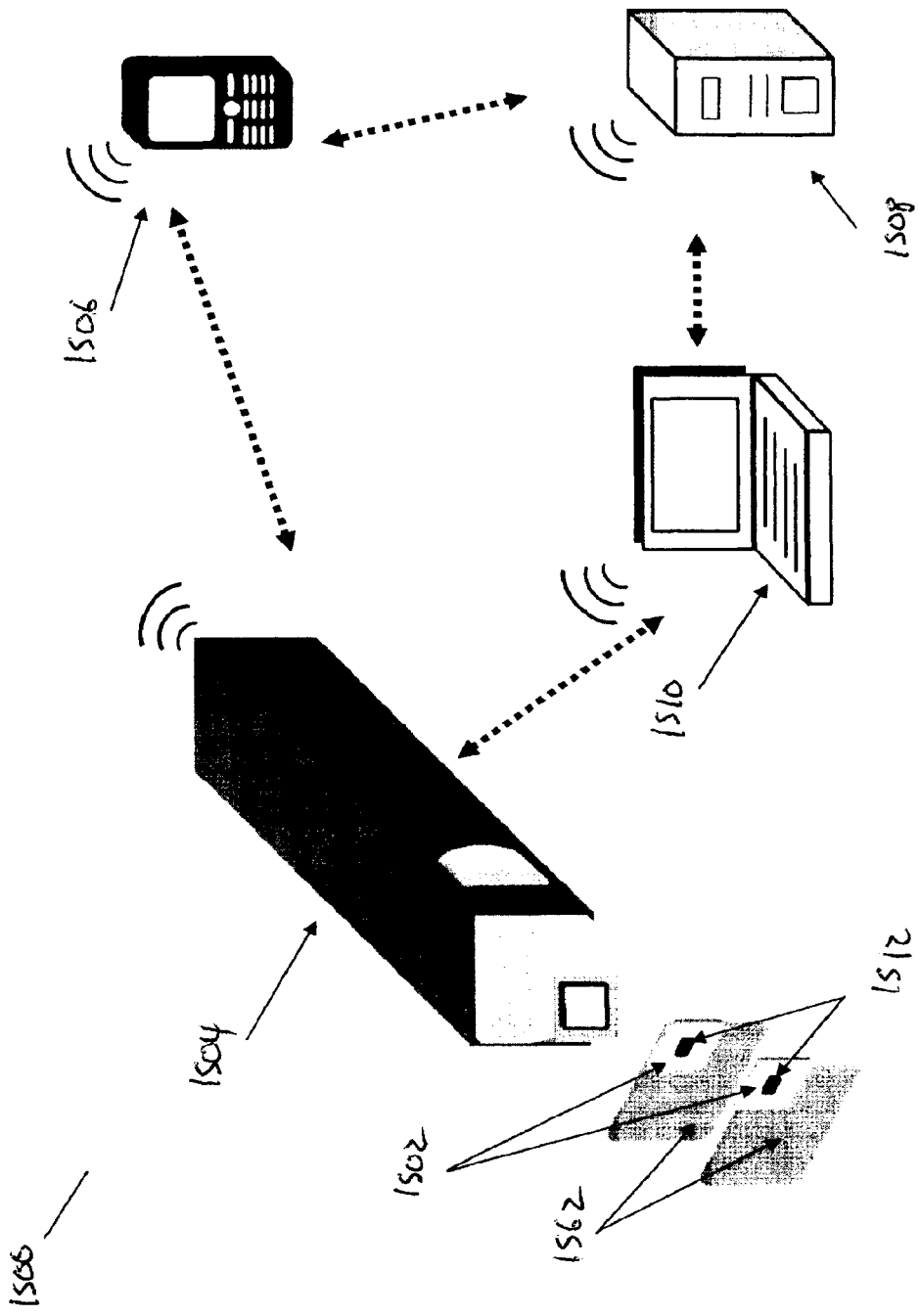
FIG. 15 shows an overall view of an anti-counterfeit system utilizing a reading device that includes a scanning module in accordance with an embodiment of the invention.

FIG. 15 shows an overall view of an anti-counterfeit system 1500 utilizing a reading device 1504, which includes a scanning module in accordance with an embodiment of the invention. Note that although the system 1500 shown here shows a basic reading device 1504 communicating with a data server 1508 via a mobile device 1506 (such as a mobile phone) or a computer 1510, it is also contemplated that the reading device 1504 may itself be more elaborate and may, for example, communicate to a database or data server 1508 via methods such as using data cables, local area networks, Bluetooth, Wi-Fi, Worldwide Interoperability for Microwave Access (WiMAX) technology, or even including using a built-in General Packet Radio Service (GPRS) chip or 3G/Universal Mobile Telecommunication System (UMTS) chip to itself act as a mobile telephonic device to communicate to the data server 1508. Although the data server 1508 is illustrated as one computer, it is also understood that it may in fact be a series of computers or servers which may or may not be linked via a router or routing protocol, as such any appropriate method of storing data and dealing with incoming authentication signals is contemplated. The reading device 1504 may also include methods for direct communication with the user, for example a screen and a keyboard, which may allow the user to read and enter information on the reading device 1504 itself. The anti-counterfeit system 1500 may include at least one tag 1502, a reading device 1504, a mobile device 1506 or a computer 1510 (if no direct communication means between the reading device 1504 and data server 1508 exists), and a remote data server 1508. Each tag 1502 comprises at least two sets of identification features, including one inherent disorder feature, such as a disordered array of magnetic or magnetisable particles, randomly distributed taggants or microbarcodes, an area where the configuration of paper fibers can be read, a piece of transparent polymer having randomly distributed bubbles, or another inherent disorder feature. The tag also includes at least one other identification feature, such as a barcode, an optically readable serial number, a hologram, an RFID tag, or a magnetic strip.

The example identification features as shown in FIG. 15 includes a disordered array of magnetic or magnetisable particles forming a magnetic fingerprint region 1512, as well as a barcode. Each tag 1502 is attached to an object or an item of value 1562 to be identified. The reading device 1504 is generally used for reading the barcode on the tag 1502 at a distance. If there is an indication that the object 1562 to which the tag 1502 has been attached may be counterfeit, or that the tag 1502 has been altered or tampered with, then the reading device 1504 can be used at close range or in contact with the tag 1502 to read the magnetic fingerprint region to verify the tag 1502. It is generally more difficult to counterfeit, alter, or tamper with the inherent disorder features of the tag 1502 than other features, such as a barcode.

The reading device 1504 has the capability to send a signal generated from reading one or both of the identification features to the mobile device 1506 or the computer 1510. Encrypted signals from the reading device 1504 can be sent out to the mobile device 1506 or the computer 1510 either through a wireless connection or a wired connection. Some examples of wireless connection include Bluetooth and Wi-Fi and some examples of wired connection include Recommended Standard 232 (RS232) and Universal Serial Bus (USB). The computer 1510 can be a personal computer, a workstation, a laptop, or a palmtop. The mobile device 1506 can be a mobile (cellular) phone or a personal digital assistant (PDA), for example. The mobile device 1506 or the computer 1510 can connect to the remote data server 1508 via the Internet. The mobile device 1506 may connect via a local network using General Packet Radio Service (GPRS) or 3G/UTMS technology, for example.

In some embodiments of the invention, there is a level of built-in intelligence in the scanning module (e.g., based on the programmed code executed by the microcontroller), which allows the signal(s) read from the identification features to be treated in different ways depending on the sequence of read operations. For example, assume that a tag that has two sets of identification features wherein the first set of identification features comprises a disordered material and the second set of identification features comprises a barcode. Assume further that a standard reading procedure is for the user to push the reading element against the tag such that the device or authentication unit senses (e.g. via a pressure switch/sensor) that it should commence reading the signal from the first set of identification features. Thereafter, the user scans the barcode by pressing a switch on the reader and pointing it towards the tag from a distance suitable for the barcode reading. If the reader is used in the above described sequence, and the switch for reading the barcode is depressed within one second of reading the signal from the first set of identification features; then the scanning module may link the signal derived from the first set of identification features with that derived from the barcode (i.e., the second set of identification features). In this way, the scanning module is able to link the first set of identification features with the barcode number printed on the tag. It communicates this combined information to the reading device into which the scanning module has been integrated, which in turn sends the information to a remote server which is able to verify from its database (by using the tag's barcode number as the primary search key) that the signal derived from the first set of identification features is consistent with the signal that was read for that tag in a previous (reference) reading. PCT application WO 2009/105040 provides examples of how signals from a first set of identification features can be used with signals from a second set of identification features and can be stored as signatures within a remote database, and how these signatures can be searched and matched for authentication purposes.

Continuing with the example described above, if the sequence of usage differs from what is discussed above, in that the user does not first try to read the first set of identification features, but instead depresses the button for barcode reading first, then the built-in intelligence of the scanning module treats the reading as a stand-alone barcode reading without expecting reading of a signal from the first set of identification features. The data is then be sent to the reading device with an identifier (for example, a different header) indicating that the data is to be treated differently, (e.g. the barcode number is displayed to the user) without communicating any information to an additional device.

In another embodiment of the built-in intelligence in the scanning module, the scanning module reads both sets of identification features substantially simultaneously. The built in intelligence in the scanning module determines when a signal from a set of identification features is successfully acquired, (e.g., in the case of the barcode, it could be when a number is successfully decoded from the barcode signal). If no barcode number is decoded within a pre-set time, then the scanning module concludes that the second set of identification features (in this example the barcode) is not present. The built in intelligence is configured such that the scanning module assesses the signal strength from the first set of identification features and processes it only if the signal strength crosses a preset threshold to be considered as successfully read and identified for further processing. Similarly, the built in intelligence of the scanning module assesses the signal strength from the second set of identification features and processes it only if the signal strength crosses a preset threshold to be considered as successfully read and identified for further processing. For example, if both sets of identification features are determined to be present, they can be processed together.

In another embodiment, if only the first set of identification features is detected and identified as present, then, for example, the user is prompted to confirm that there was indeed only the first set of identification features present. If this is confirmed, then the signal is sent to an additional device for further processing (e.g. the additional device can be a remote server and database and it matches the signal against all the signals that exist within the database).

In another embodiment of the mode of operation, the user is prompted to manually enter a number (associated with the first set of identification features) via a keyboard on the device, wherein the number is used as the primary key to search the data in the remote database for a matching signature. If the user does not confirm that there was only the first set of identification features present, then the system/scanning module is immediately reset for a rescan.

In another embodiment of the mode of operation, if only the barcode is present, then the system uses an alerting means (such as beeps) to inform the user that the barcode was successfully read, and the barcode number could be communicated to an additional device for storage or processing.

The embodiments described above by way of non-limiting examples illustrate some of the modes by which the inbuilt intelligence of the scanning module is adapted and exploited to execute operations using the signals from multiple sets of identification features. It is to be appreciated that it is possible to equip the built in intelligence in the scanning module with diverse pre-settings, to respond to operation requirements (such settings may be defined at start up, for example, by way of a configuration file, or could be communicated to the device, which in turn is instructed as to which setting is appropriate by way of a toggle switch set by the user). Similarly, the device is equipped with built in intelligence to operably link with additional devices associated with the scanning module to read and identify signals from the identifier sets.

Although the examples above have stressed the case where the data required to match the signatures is stored in a remote database, other configurations are possible. For example the scanning module may have sufficient internal memory to store at least some reference signatures or data, such that matching of the read signature is processed within the authentication unit itself. As used herein, the term "closed-loop" systems describes any system (such as the one described above) wherein the data from the signal derived from the first set of identification features does not need to be communicated to an additional device for matching to occur. In other words, in a closed-loop system, the matching occurs within the scanning module (in some embodiments, even within the authentication unit), or the device. Another closed-loop system example is where the scanning module is adapted to be able to read signature matching information from an external memory device, such as a Secure Digital memory card (also known as an SD card or an SD memory card), which is plugged into a slot within the scanning module or the reading device such that the scanning module either has access to the required data or is passed the required data. Alternatively, the device itself may be equipped with sufficient memory to pass this information to the scanning module. Yet another alternative is for the reading device to have the capacity to do the matching, in which case the obtained data are passed from the scanning module to the reading device for matching.

Yet another example of a closed-loop system is where the information necessary for matching is stored within one of the identification features itself. For example, a sufficiently large data-matrix barcode is able to store significant information, a part of which may be encrypted data used for matching the signature derived from the first set of identification features associated with the same tag or object with which the data-matrix code is associated. RFID tags, for example, are also well suited for storing such data and providing it to the scanning module or device as required for matching.

As discussed above, embodiments of the present invention can use a wide variety of near-field and far-field readers in combination within an integrated scanning module.

Figure 16:
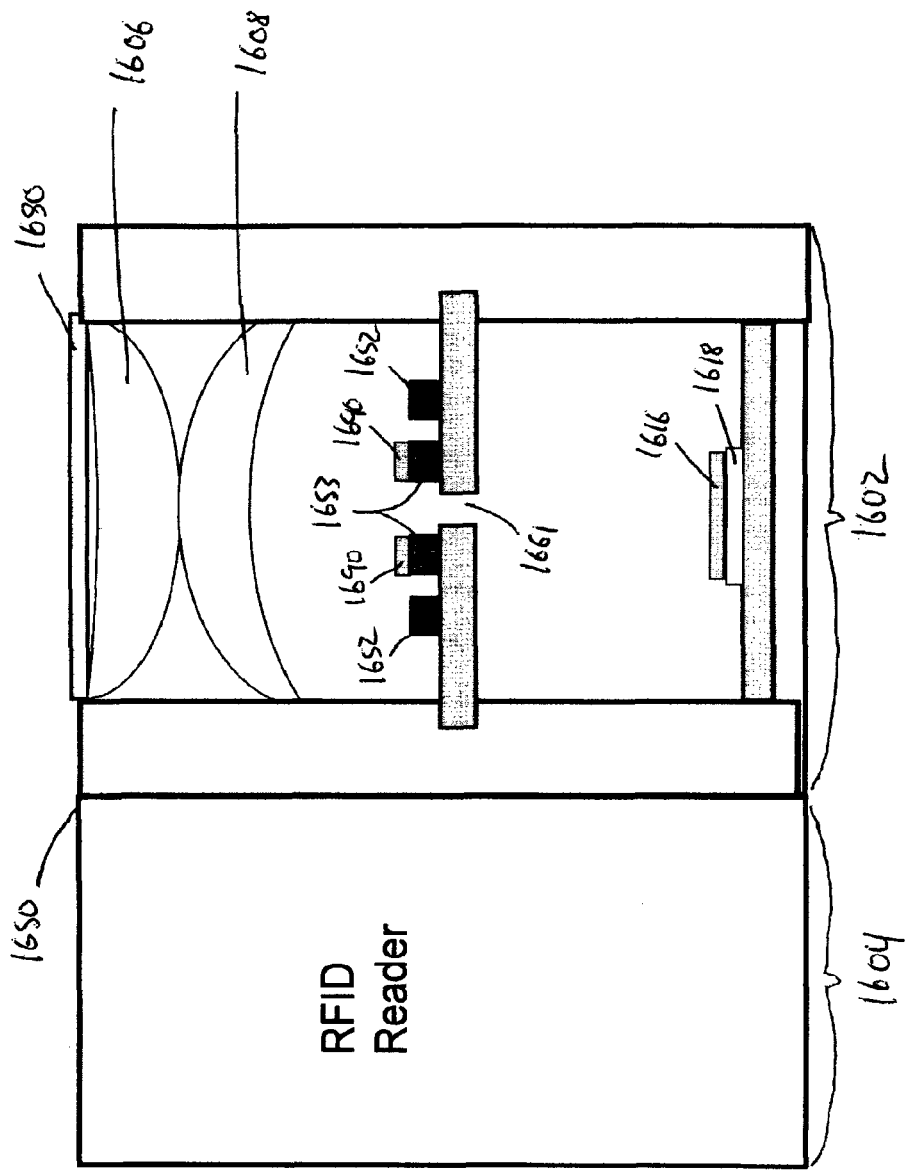
FIG. 16 shows an alternative embodiment of an authentication unit including both a near-field inherent disorder reader and a far-field identification and/or authentication reader.

FIG. 16 shows one such additional combination. The authentication unit 1600 of FIG. 16 includes a near-field reader 1602 for reading optical and magnetic features, similar to the reader described above with reference to FIG. 8. Unlike the reader shown with reference to FIG. 8, the reader 1602 does not include lighting elements for far-field illumination, or a beam splitter, since there is no shared optical path with a far-field reader. The reader 1602 does, however, include lighting elements 1652 and 1653, polarizers 1690, disposed in front of the lighting elements 1653, lenses 1606 and 1608, a magneto-optical substrate 1680, a pinhole 1661, a second polarizer 1616, and an optical processing unit 1618. These parts are arranged in a similar manner to that shown in FIG. 8, and operate in a similar manner when the authentication unit 1600 is being used as a near-field reader, to read a magnetic inherent disorder feature.

The second reader in the authentication unit 1600 is an RFID reader 1604. RFID reader 1604 is contained in the same housing 1650 that includes the near-field reader 1602. RFID reader 1604 includes known circuitry (not shown) for reading RFID tags at a distance. The RFID reader 1604 may be connected to an antenna (not shown).

When using a combination of an optical reader and a non-optical reader in a single unit, such as the authentication unit 1600, it is not generally possible to share optical components between the readers, since one of the readers (i.e., RFID reader 1604) does not use optical components. Such combinations may still be able to share the electronic components of a scanning module (see FIGS. 14A and 14B above) for decoding signals, and a common housing. Additionally, such a combination may provide similar benefits of convenience in integrating the combined unit into an application-specific reading device, and similar authentication benefits, since an inherent disorder feature can be read to authenticate a tag or object when there is any question of identification or authenticity based on the far-field reading.

Figure 17:
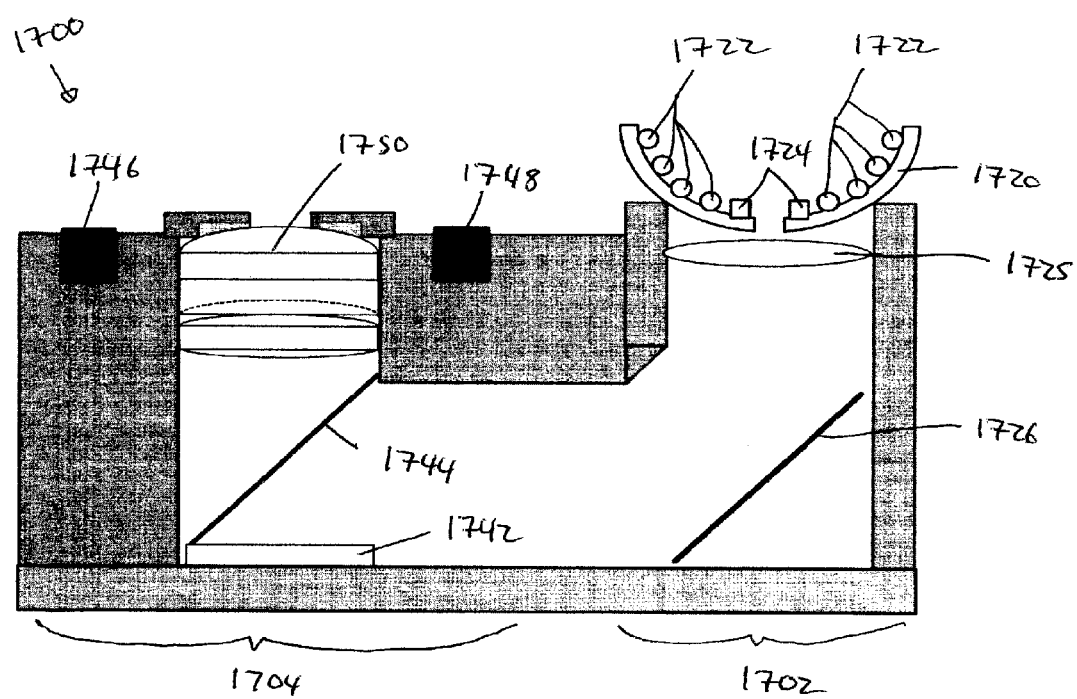
FIG. 17 shows a further alternative embodiment of an authentication unit including both a near-field inherent disorder reader and a far-field identification and/or authentication reader.

Embodiments of the invention also include embodiments with various near-field readers for reading inherent disorder features. For example, FIG. 17 shows an authentication unit 1700 that includes a near-field reader 1702, which reads the pattern of randomly distributed bubbles within a piece of transparent polymer (a "bubble tag"), as described, for example in U.S. Pat. No. 7,380,128, assigned to Novatec, SA, of Montauben, France. As described in greater detail in U.S. Pat. No. 7,380,128, the reader may include a dome-shaped portion 1720, including lighting elements 1722 and 1724 disposed on the periphery of the dome-shaped portion 1720. When reading a bubble tag, the lighting elements 1722 and 1724 are lighted to provide diffuse lighting, which provides an image of the contours of the bubbles. This is immediately followed by taking another image, in which only the lighting elements 1724 are lighted, while the lighting elements 1722 are dark, to provide direct lighting, providing an image of the bubble shadows. These images can then be analyzed to provide unique identification and/or authentication information.

In the embodiment shown in FIG. 17, light including the images of the bubble tag described above passes through a lens system 1725, and is reflected by a mirror 1726 towards a beam splitter 1744, which directs at least a portion of the light onto an optical processing unit 1742, which reads the images of the bubble tags. The optical processing unit 1742 is shared with the second reader 1704 that is integrated into the authentication unit 1700, for reading barcodes at a distance.

The second reader 1704 is similar to the far-field barcode reader discussed above with reference to FIG. 5. It includes lighting elements 1746 and 1748, and lens system 1750. When reading a barcode, the barcode is illuminated by lighting elements 1746 and 1748. Light reflected from the barcode passes through the lens system 1750, and at least a portion of the light passes through the beam splitter 1744, to be read by the optical processing unit 1742.

Although the authentication unit 1700 shows a combination of a near-field bubble tag reader with a far-field barcode reader, it will be understood from the examples provided above that many alternative combinations may be used. In accordance with embodiments of the invention, a variety of near-field inherent disorder-based readers may be used, such as a reader that uses the inherent disorder of fibers within paper, a bubble tag reader, a reader for randomly distributed quantum dots or nanobarcodes, a reader for a non-magnetic or weakly magnetic matrix material, such as ink containing magnetic particles arranged in a disordered pattern, a reader for random "jitter" in the magnetic stripes of credit cards, a reader for randomly distributed taggant particles that are difficult to detect by unassisted human vision, and/or a reader for magnetic and/or magnetisable and/or conductive and/or semi-conductive and/or optically active particles and/or optically distinguishable particles. Similarly, a variety of other far-field readers for a variety of identification and/or authentication features can be combined with any of the above-mentioned inherent disorder readers, including readers for barcodes, optical characters, RFID, or other identification technologies. In general, embodiments of the present invention could be made using any of these near-field inherent disorder readers in combination with any of these far-field identification and/or authentication feature readers.

Figure 18:
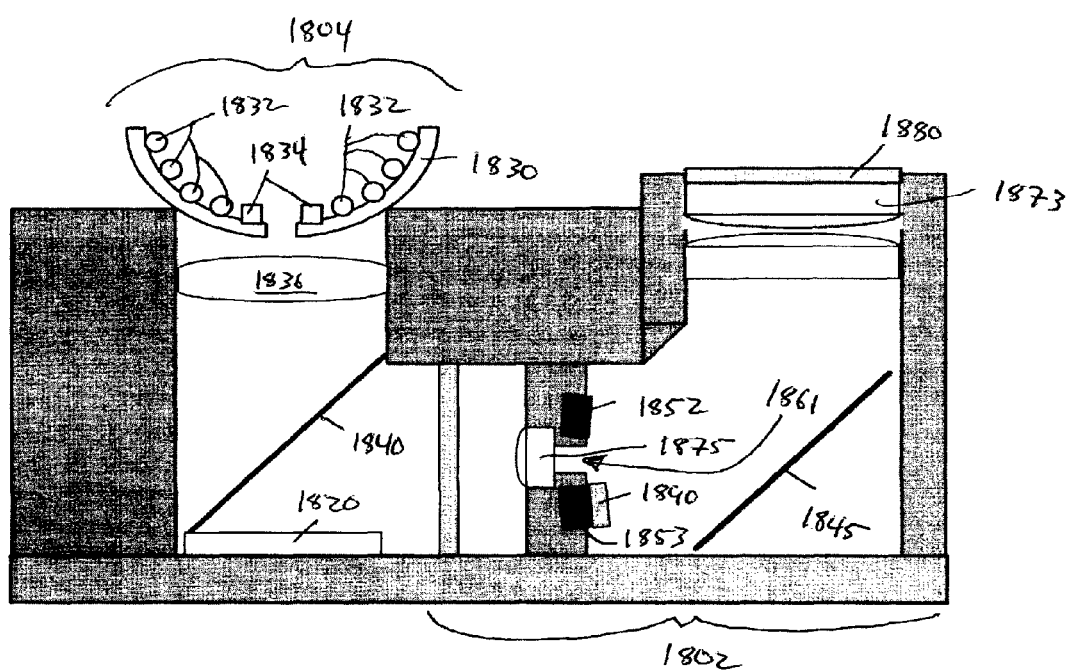
FIG. 18 shows an alternative embodiment of an authentication unit including a first near-field inherent disorder reader and a second near-field identification and/or authentication reader.

Another embodiment of the invention involves the combination of two near-field readers, at least one of which is a reader for an inherent disorder feature, such that the near-field readers read features that are placed in a predetermined, non-overlapping spatial relationship with each other. Such a reader is shown in FIG. 18. The authentication unit 1800 includes a first inherent disorder reader 1802, which reads a configuration of magnetic particles, such as is discussed above. A second near-field reader 1804—in this case a second inherent disorder reader for reading bubble tags, such as is shown in FIG. 17, is combined with the near-field reader 1802 within the same authentication unit 1800.

The first inherent disorder reader 1802 includes lighting elements 1852 and 1853, a polarizer 1890 disposed in front of the lighting element 1853, a polarizer 1891, a magneto-optical substrate 1880, a lens system 1873, a lens system 1875, a pinhole 1861, a mirror 1845, a beamsplitter 1840, and an optical processing unit 1820. These elements are arranged so that a near-field magnetic pattern overlapping or below a bar code can be read as described above with reference to FIG. 5.

The second near field reader 1804 includes a dome-shaped portion 1830, including lighting elements 1832 and 1834 disposed on the periphery of the dome-shaped portion 1830. A lens system 1836 directs light from reading a bubble tag through the beamsplitter 1840, so it can be read by the optical processing unit 1820. The operation of such a bubble tag reader is described above with reference to FIG. 17.

The tags read by the authentication unit 1800 may include a magnetic tag with a barcode, e.g., as described above with reference to FIG. 3, and a bubble tag—i.e., a piece of transparent polymer containing randomly distributed bubbles. For use with the authentication unit 1800, the tags should be placed in a non-overlapping spatial arrangement such that when the first inherent disorder reader 1802 is placed in the proximity of or in contact with the magnetic particle portion of the tag, the second near-field reader can be placed in the proximity of or in contact with the bubble tag. Therefore, the spacing of the readers in the authentication unit 1800 conforms to the spacing of the near-field features on a tag.

It will be understood that although the authentication unit 1800 includes a magnetic particle reader and a bubble tag reader, other types of near field readers could also be combined. In accordance with embodiments of the invention, an inherent disorder reader, such as a reader that uses the inherent disorder of fibers within paper, a bubble tag reader, a reader for randomly distributed quantum dots or nanobarcodes, a reader for a non-magnetic or weakly magnetic matrix material containing magnetic particles arranged in a disordered pattern, a reader for random "jitter" in the magnetic stripes of credit cards, a reader for randomly distributed taggant particles that are difficult to detect by unassisted human vision, and/or a reader for magnetic and/or magnetisable and/or conductive and/or semi-conductive and/or optically active particles and/or optically distinguishable particles, may be combined with another near-field reader, such as a reader for the above-listed inherent disorder features, or a reader for other near-field features, such as a magnetic strip reader, a near-field barcode reader, or a near-field RFID reader. In accordance with embodiments of the invention, the readers are configured to read a near-field inherent disorder feature and a second near-field feature that are arranged in a predetermined, non-overlapping spatial relationship to each other.

In general, embodiments of the invention may include an authentication unit that is adapted to read a first signal from a first set of identification features and a second signal from a second set of identification features, wherein the sets of identification features are housed on, in or near the tag or object adapted to be identified, and include a disordered material, and the signal derived from said first set of identification features is dependent on the intrinsic disorder of the material. The second set of identification features may be any type of identification features, whether based on inherent disorder or not. For example, the second set of identification features may include a barcode, optical characters, radio-frequency identification (RFID) tag, a smart chip, magnetic information written on a magnetic medium, etc.

In accordance with embodiments of the invention, the authentication unit may include at least one reading element, a processing element and a communication element. If the authentication unit includes just one reading element then that reading element is adapted to read at least a first signal derived from the first set of identification features and a second signal derived from the second set of identification features. Alternatively, the authentication unit may include more than one reading element, where the second reading element is, for example a barcode scanner, an RFID scanner, a smart chip scanner, a sensor adapted to optical character recognition or a magnetic read head depending on the second set of identification features. In some embodiments some components may be shared between the first and the second reading elements.

In various embodiments, the processing element is configured to at least partially process the signals derived from the sets of identification features. In general the processing element includes at least a printed circuit board assembly ("PCBA") with a microprocessor unit, memory and firmware to process the signals intelligently, as discussed above. The authentication unit also includes a communication element to communicably link with other components of the device in which it is housed or it may be adapted to communicate directly with a remote/external device or system (e.g. the internet and a remote server). Depending on the mode of communication, the communication element may include a Bluetooth module, Ethernet module, Wi-Fi module, USB interface, GPIO interface, SPI interface, I2C interface, UART interface or RS232 interface. In some variants, the communication element is housed on the same PCBA that includes the processing element and may, in some embodiments, be housed in the microprocessor of the processing unit, (i.e. the communication unit and processing unit is one and the same unit).

The authentication unit in accordance with various embodiments is adapted to be housed inside a device. In its simplest form, the device includes a power source and a housing to hold the authentication unit. In another embodiment, the device may include an external casing with user interfaces (for example a screen, keyboard, indication lights, buttons, a speaker/buzzer and the like), a central processing unit, internal memory, power management, power source and processing logic (which includes firmware and/or software) to control the functionality of the device. In yet another embodiment the device may include communication modules or interfaces to communicate with other devices such as computers and the internet. For a mobile device, the power source usually is a battery or set of batteries. For a desktop or fixed device, generally the power source is a standard line source. In some embodiments, the authentication unit communicates with the device which in turn communicates with the user and/or external devices, as discussed above. Alternatively, the device may be a "closed loop" system as discussed above.

Figure 19A:
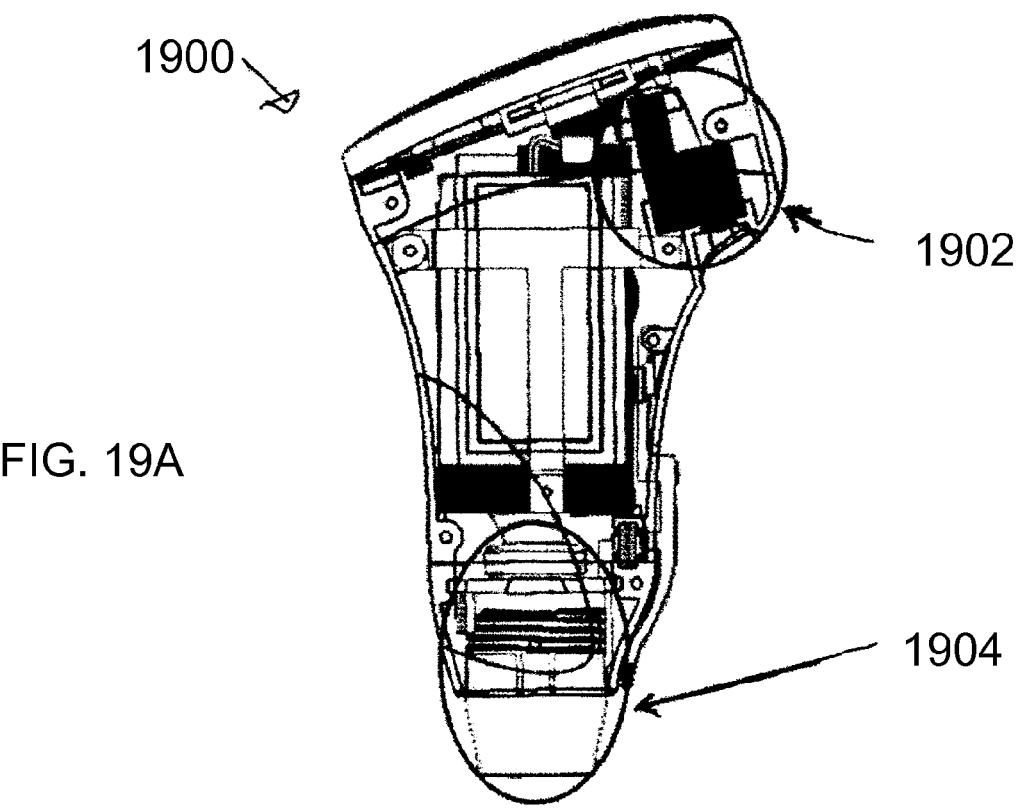
FIGS. 19A and 19B show a reading device that includes both a near-field inherent disorder reader and a far-field identification and/or authentication reader in accordance with a further alternative embodiment of the present invention.
Figure 19B:
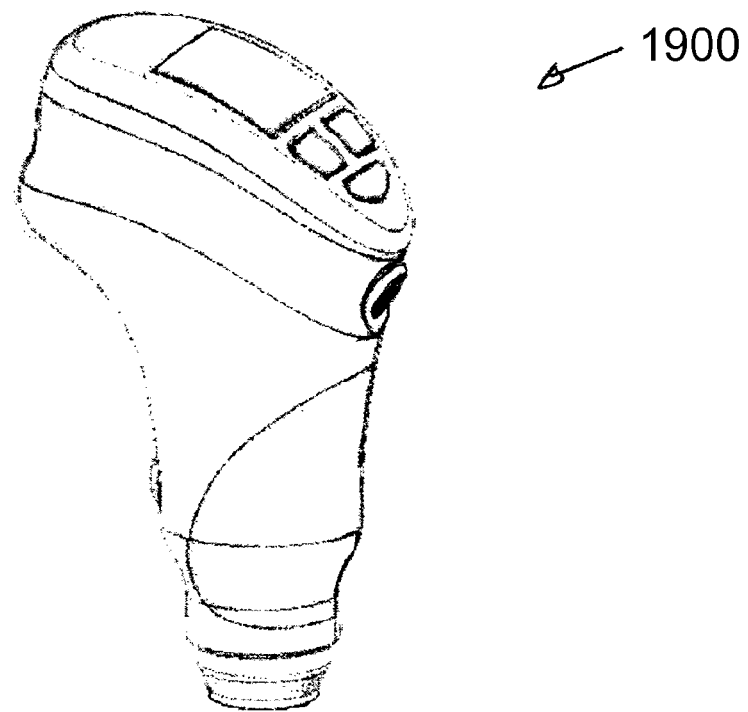

As discussed above, in many embodiments, the authentication unit may be housed in a single integrated package or scanning module, with the readers, along with other scanning-related circuitry sharing a single housing or other modular arrangement. In some embodiments, however, the readers may be arranged within a single device, but not within a single, integrated module. FIG. 19A shows such an arrangement, in which a single reading device 1900 (the casing of which is shown in FIG. 19B) includes a far-field barcode scanner 1902, and a near-field inherent disorder reader 1904 that reads an arrangement of magnetic particles as discussed above. The two readers still share a common housing (i.e., the housing of the device), and may share electronic components (not shown) of a scanning module for decoding the signals from the two devices.

Figure 20:
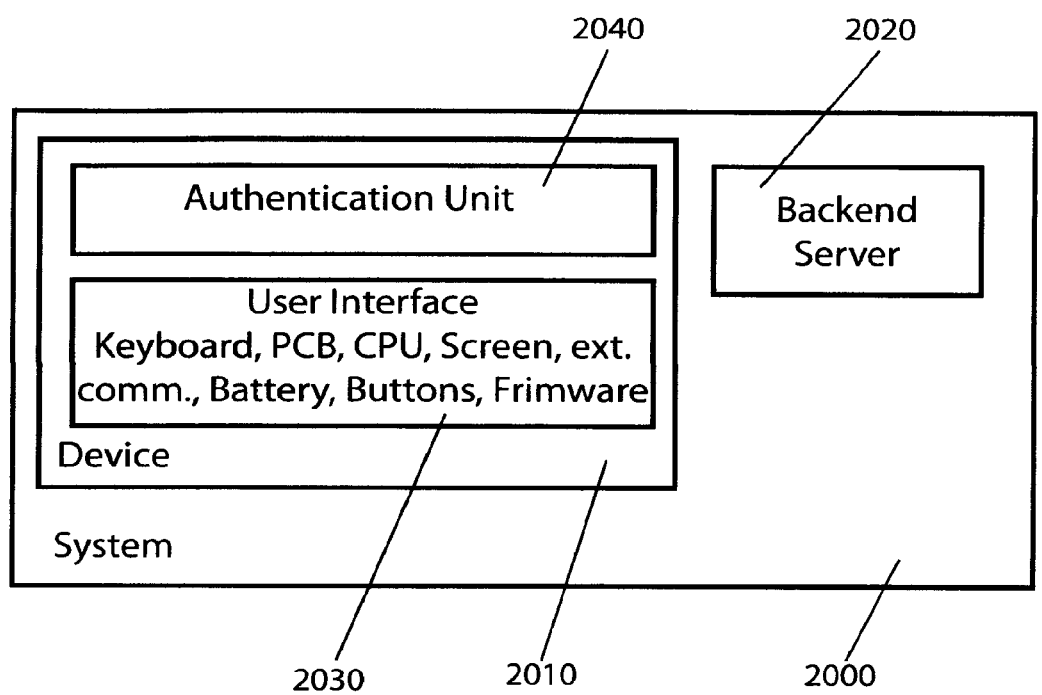
FIG. 20 shows a block diagram of a system including an authentication unit in accordance with an embodiment of the invention.

The authentication unit, the device and, if appropriate, additional devices, such as an external computer system, server, or network of servers including a database or distributed database, are communicably linked to form a "system" for reading/authenticating/verifying a tag or object adapted to be identified. Such a system is depicted in FIG. 20, wherein the additional device is shown as being backend server(s) in the figure. As can be seen, the system 2000 includes a reading device 2010 and a backend server or servers 2020. The reading device 2010 may include components 2030, such as a user interface, a keyboard, a PCB, a CPU, a screen, circuitry for external communications, a battery or other power source, buttons and/or other user interface elements, firmware or other memory, etc. The reading device also includes an authentication unit 2040, adapted to read a first signal from a first set of inherent disorder-based identification features and a second signal from a second set of identification features, as discussed above.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An authentication unit for identifying a tag or an other object adapted to be identified, wherein the authentication unit is adapted to read a first signal from a first set of identification features and a second signal from a second set of identification features, wherein the sets of identification features are housed on, in, or near the tag or object to be identified, and wherein the first set of identification features comprises a disordered material, and the first signal read from the first set of identification features is dependent on the intrinsic disorder of the material.

2. The authentication unit of claim 1, wherein the second set of identification features comprises a barcode, optical characters, a radio-frequency identification (RFID) tag, a smart chip, and/or magnetic information written on a magnetic medium.

3. The authentication unit of claim 1 or claim 2, comprising a reading element adapted to read at least the first signal from the first set of identification features and the second signal from the second set of identification features.

4. The authentication unit of claim 1 or claim 2, comprising a first reading element adapted to read at least the first signal from the first set of identification features and a second reading element adapted to read the second signal from the second set of identification features.

5. The authentication unit of any one of claims 1-4, wherein the authentication unit further comprises a processing element configured to at least partially process the first signal and the second signal.

6. The authentication unit of claim 5, wherein the processor is configured to link the first signal and the second signal, or to read only the second signal, depending on a sequence and/or a timing of reading the first signal and/or the second signal.

7. The authentication unit of claim 5 or claim 6, wherein the processor is configured to process the first signal and/or the second signal either together or separately, depending on a determination of which of the first signal and/or the second signal are present in a reading.

8. The authentication unit of any one of claims 1-7, wherein the authentication unit further comprises a communication element adapted to communicably link with other components of the device in which the authentication unit is housed or to communicate directly with a remote/external device or system.

9. A system for reading and identifying a tag or object adapted to be identified, the system comprising a device that includes an authentication unit according to any of claims 1-8, and one or more of a keyboard, a CPU, a screen, circuitry for external communications, a battery, one or more buttons, memory, and firmware.

10. The system of claim 9, wherein data used for identifying the tag or object is stored in a memory of the device or the authentication unit.

11. The system of claim 9, wherein the system further comprises a backend server that stores data used for identifying the tag or object, and wherein the device communicates with the backend server to identify the tag or object.

* * * * *